(12) United States Patent  
Miyamoto et al.

(10) Patent No.: US 12,407,125 B2
(45) Date of Patent: Sep. 2, 2025

(54) CONNECTOR

(71) Applicant: SUMITOMO WIRING SYSTEMS, LTD., Yokkaichi (JP)

(72) Inventors: Takeru Miyamoto, Yokkaichi (JP); Shigeyuki Okada, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 324 days.

(21) Appl. No.: 18/250,538

(22) PCT Filed: Nov. 10, 2021

(86) PCT No.: PCT/JP2021/041376
§ 371 (c)(1),
(2) Date: Apr. 26, 2023

(87) PCT Pub. No.: WO2022/102665
PCT Pub. Date: May 19, 2022

(65) Prior Publication Data
US 2023/0411895 A1  Dec. 21, 2023

(30) Foreign Application Priority Data

Nov. 13, 2020  (JP) ................................ 2020-189639
Feb. 25, 2021  (JP) ................................ 2021-029072

(51) Int. Cl.
*H01R 13/502*   (2006.01)
*B60R 16/03*    (2006.01)
(Continued)

(52) U.S. Cl.
CPC .......... *H01R 13/502* (2013.01); *H01R 13/42* (2013.01); *H01R 13/5202* (2013.01); *B60R 16/03* (2013.01)

(58) Field of Classification Search
None
See application file for complete search history.

(56) References Cited

U.S. PATENT DOCUMENTS 9,705,233 B2 * 7/2017 Yamada ................... H02S 40/34
10,511,129 B1   12/2019 Jung et al.
(Continued)

FOREIGN PATENT DOCUMENTS

CN   206893942 U   1/2018
JP   2013025936 A   2/2013
JP   2017188198 A   10/2017

*Primary Examiner* — Tho D Ta

(57) ABSTRACT

In the present invention, a cover closes an opening in a housing holding a plurality of terminals. Each of the terminals has a connection part connecting to a mate terminal. The cover has a first surface, a second surface located at a rear side of the first surface including an exposed surface exposed to the inner side of the housing through the opening, a first reinforcement rib projecting from the first surface, and a second reinforcement rib projecting from the second surface. The direction in which the plurality of connection parts are arranged is defined as a first direction. The direction that intersects the first direction and that is oriented from the basal end toward the distal end of the connection parts is defined as a second direction. The first reinforcement rib extends along the first direction. The second reinforcement rib extends along the second direction between adjacent connection parts.

10 Claims, 10 Drawing Sheets

(51) Int. Cl.
*H01R 13/42* (2006.01)
*H01R 13/52* (2006.01)

(56) References Cited

U.S. PATENT DOCUMENTS

| | | |
|---|---|---|
| 10,811,817 B1 * | 10/2020 | Peterson .............. H01R 13/502 |
| 11,217,930 B2 * | 1/2022 | Wakimoto ......... H01R 13/5219 |
| 11,398,702 B2 * | 7/2022 | Yokotani .............. H01R 13/703 |
| 2018/0316142 A1 | 11/2018 | Yokotani |
| 2019/0067886 A1 | 2/2019 | Jung |
| 2020/0176895 A1 * | 6/2020 | Hata .................... H01R 4/2433 |

* cited by examiner

CONNECTOR

BACKGROUND

Field of the Disclosure

The present disclosure relates to a connector.

Related Art

In the prior art, an electrical device mounted on a vehicle is accommodated in a case. An example of such an electrical device is electrically connected to another electrical device by a connector that is electrically connected to a terminal mount fixed to the case. The terminal mount is disposed in a mount hole of the case. The mount hole connects the inside and the outside of the case.

Japanese Laid-Open Patent Publication No. 2017-92418 discloses an example of a connector connected to a terminal mount. The connector includes a connector housing including an opening, terminals held by the connector housing, and a cover closing the opening.

When electrically connecting the connector to the terminal mount, first, the connector housing is disposed on the terminal mount. At this time, the cover is not coupled to the connector housing, and the opening is not closed by the cover. Subsequently, a tool is inserted into the connector housing from the opening, and the terminals are electrically connected to respective mate terminals mounted on the terminal mount with the tool. Then, the opening is closed by the cover.

The temperature inside the case may be increased to a high temperature by heat generated by the electrical device and the like. This increases the pressure of the case, which increases the pressure applied to the cover from the inside of the case. Changes in the pressure may deform the cover. Deformation of the cover may form a gap between the cover and the connector housing. When a gap is formed between the cover and the connector housing, a liquid such as water may enter the inside of the connector through the gap.

It is an objective of the present disclosure to provide a connector that restricts deformation of a cover.

SUMMARY

A connector according to the present disclosure includes a connector housing including an opening, a cover closing the opening, and terminals held by the connector housing. Each of the terminals includes a connection part configured to be electrically connected to one of a plurality of mate terminals, the mate terminals differing from one another. The connection parts are arranged in a line in the connector housing. The cover includes a first surface exposed outside the connector housing and a second surface located at a rear side of the first surface. The second surface includes an exposed surface exposed from the opening to an inner side of the connector housing. The cover further includes at least one first reinforcement rib projecting from the first surface and at least one second reinforcement rib projecting from the second surface. When a first direction refers to a direction in which the connection parts are arranged, a second direction refers to a direction intersecting the first direction and extending from a basal end to a distal end of the connection parts, and a third direction refers to a direction orthogonal to the first direction and the second direction, the first reinforcement rib extends in the first direction, and the second reinforcement rib extends in the second direction between adjacent ones of the connection parts as viewed in the third direction.

The connector according to the present disclosure restricts deformation of the cover.

DETAILED DESCRIPTION

Description of Embodiments of Present Disclosure

Figure 1:
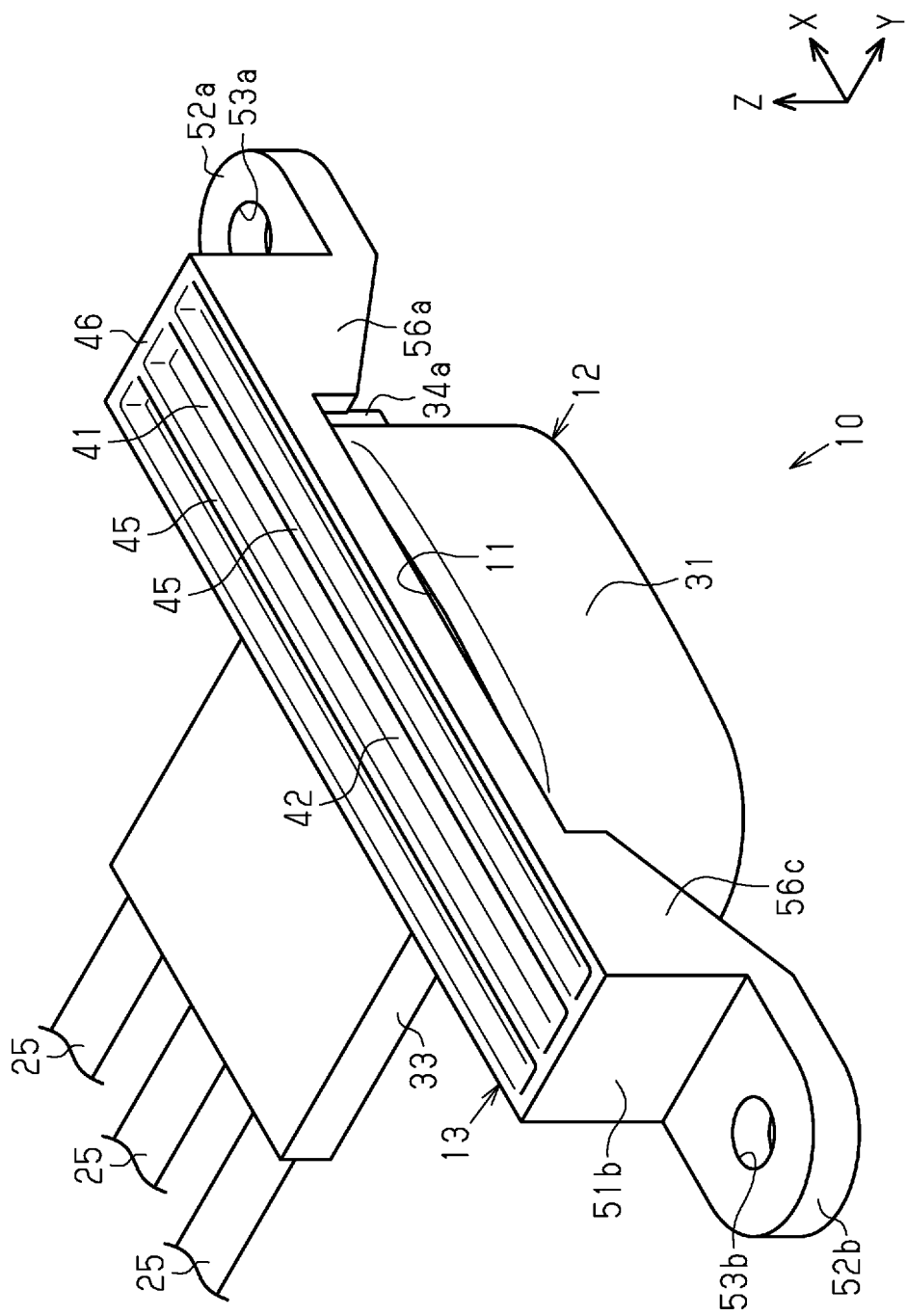
FIG. 1 is a perspective view showing an embodiment of a connector.

The embodiments of the present disclosure will now be described.

A connector according to the present disclosure, including

[1] a connector housing including an opening, a cover closing the opening, and terminals held by the connector housing. Each of the terminals includes a connection part configured to be electrically connected to one of a plurality of mate terminals, the mate terminals differing from one another. The connection parts are arranged in a line in the connector housing. The cover includes a first surface exposed outside the connector housing and a second surface located at a rear side of the first surface. The second surface includes an exposed surface exposed from the opening to an inner side of the connector housing. The cover further includes at least one first reinforcement rib projecting from the first surface and at least one second reinforcement rib projecting from the second surface. When a first direction refers to a direction in which the connection parts are arranged, a second direction refers to a direction intersecting the first direction and extending from a basal end to a distal end of the connection parts, and a third direction refers to a direction orthogonal to the first direction and the second direction, the first reinforcement rib extends in the first direction, and the second reinforcement rib extends in the second direction between adjacent ones of the connection parts as viewed in the third direction.

With this structure, the cover includes the first reinforcement rib and the second reinforcement rib, respectively arranged on the two surfaces, namely, the first surface and the second surface located at the rear side of the first surface. The first reinforcement rib projects from the first surface and extends in the first direction. The second reinforcement rib projects from the second surface and extends in the second direction, which intersects the first direction. This increases the rigidity of the cover as compared to a structure in which only one of the first surface and the second surface includes a reinforcement rib or a structure in which the first reinforcement rib and the second reinforcement rib extend in the same direction. Thus, when the cover receives an external force, deformation of the cover is restricted.

[2] Preferably, the cover includes a sealing portion projecting from the second surface to surround the exposed surface as viewed in the third direction, the sealing portion is fitted into the opening, and at least one of the second reinforcement rib is greater than the sealing portion in a length of projection from the second surface.

With this structure, the sealing portion also increases the rigidity of the cover. The sealing portion, fitted into the opening, readily limits entrance of liquid such as water into the connector housing from the opening.

[3] Preferably, the cover includes a resin molding component, and as viewed in any of the second direction and the third direction, the second reinforcement rib is disposed between each two of the connection parts located adjacent to each other in the first direction.

This structure allows the second reinforcement rib to be elongated in the third direction as compared to a structure in which the second reinforcement rib is disposed between the connection parts located adjacent to each other in the first direction as viewed in the third direction but is not disposed between the connection parts located adjacent to each other in the first direction as viewed in the second direction. Thus, the rigidity of the cover is further increased.

[4] Preferably, the second surface extends wider than the exposed surface in opposite directions along the first direction, the connector housing includes two first guides extending in the third direction from two ends of the connector housing located at opposite sides in the first direction, the cover includes two second guides projecting from two parts of the second surface located outward from the exposed surface in the first direction, and the two second guides are fitted to the two first guides using a recess and a projection to restrict misalignment of the connector housing with the cover in the first direction and the second direction.

With this structure, when the cover is disposed on the connector housing, the first guides are fitted to the second guides using a recess and a projection. Thus, the cover is easily positioned on the connector housing in the first direction and the second direction. This facilitates the coupling of the cover to the connector housing.

[5] Preferably, the cover includes two first reinforcement parts and/or two second reinforcement parts, the two first reinforcement parts extend on the second surface from the two second guides to a first end of the cover in the second direction, and the two second reinforcement parts extend on the second surface from the two second guides to a second end of the cover in the second direction.

With this structure, the rigidity of the cover is increased by the second guides and the first reinforcement parts and/or the second reinforcement parts.

[6] Preferably, the cover includes a peripheral wall projecting from the first surface and extending along a peripheral edge of the first surface.

With this structure, the rigidity of the cover is further increased by the peripheral wall.

[7] Preferably, the peripheral wall annularly extends along the peripheral edge of the first surface.

With this structure, including the annular peripheral wall, the rigidity of the cover is more likely to be increased than with a structure in which the peripheral wall is not annular.

[8] Preferably, the at least one second reinforcement rib includes second reinforcement ribs, and the cover includes at least one joint rib that joins ones of the second reinforcement ribs that are located adjacent to each other in the first direction.

With this structure, the rigidity of the second reinforcement ribs is increased. Thus, the rigidity of the cover is further increased.

[9] Preferably, the cover includes two of the first reinforcement rib.

With this structure, the rigidity of the cover is increased as compared to a structure in which the cover includes only one first reinforcement rib. In addition, the shape of the cover is simplified as compared to a structure in which the cover includes three or more first reinforcement ribs. Furthermore, the material forming the cover is reduced as compared to a structure in which the cover includes three or more first reinforcement ribs.

[10] Preferably, the cover includes two end surfaces located in the second direction, at least one of the two end surfaces includes an outward surface extending in the first direction, and the cover includes a sealing portion projecting from the second surface to surround the exposed surface as viewed in the third direction, the sealing portion is fitted into the opening, an annular sealant sealing a gap between the connector housing and an outer surface of the sealing portion that faces the connector housing, and a protrusion protruding from at least one of the outward surface in the second direction or a direction opposite to the second direction.

With this structure, in addition to the sealing portion, the sealant limits entrance of liquid into the connector housing from the opening of the connector housing. In addition, when the cover is not coupled to the connector housing and is placed on a surface of a ground, a floor, or the like, the cover may be located so that the outward surface, from which the protrusion protrudes, faces the surface. In this case, the cover is located on the surface of a ground, a floor, or the like, so that the protrusion, protruding from the outward surface, spaces the outward surface apart from the surface. That is, the cover is partially lifted by the protrusion and is located on the surface. Thus, the sealing portion is likely to be disposed at a position separated upward from the surface of a ground, a floor, or the like. This limits contact of the sealant, which is disposed on the outer surface of the sealing portion, with the surface of a ground, a floor, or the like. Accordingly, objects such as sand or dust on the surface are less likely to collect on the sealant.

Detailed Description of Embodiments of Present Disclosure

Specific examples of a connector according to the present disclosure will be described below with reference to the drawings. The present disclosure is not limited to those exemplified and is shown by the scope of the claims. It is intended to include all modifications within the meaning and range equivalent to the scope of the claims. The dimensional proportion of a component may not be drawn to scale or may differ between drawings.

An embodiment of a connector will now be described.

FIG. 1 shows the present embodiment of a connector 10 configured to be electrically connected to an electrical device, which is mounted on a vehicle and is not shown in the drawings. An example of the electrical device is a wheel driving motor used as a power source for the vehicle to travel. However, the electrical device is not limited to the motor. The electrical device is accommodated in a case, which is not shown in the drawings. The case has a mount hole that connects the inside and the outside of the case. A terminal mount includes mate terminals 9 and is disposed in the mount hole. The mate terminals 9 are shown in only FIG. 7. The terminal mount includes, for example, three mate terminals 9. The mate terminals 9 are each electrically connected to the electrical device inside the case. When the connector 10 is disconnected from the terminal mount, the mate terminals 9 are exposed to the outside of the case from the terminal mount.

Figure 2:
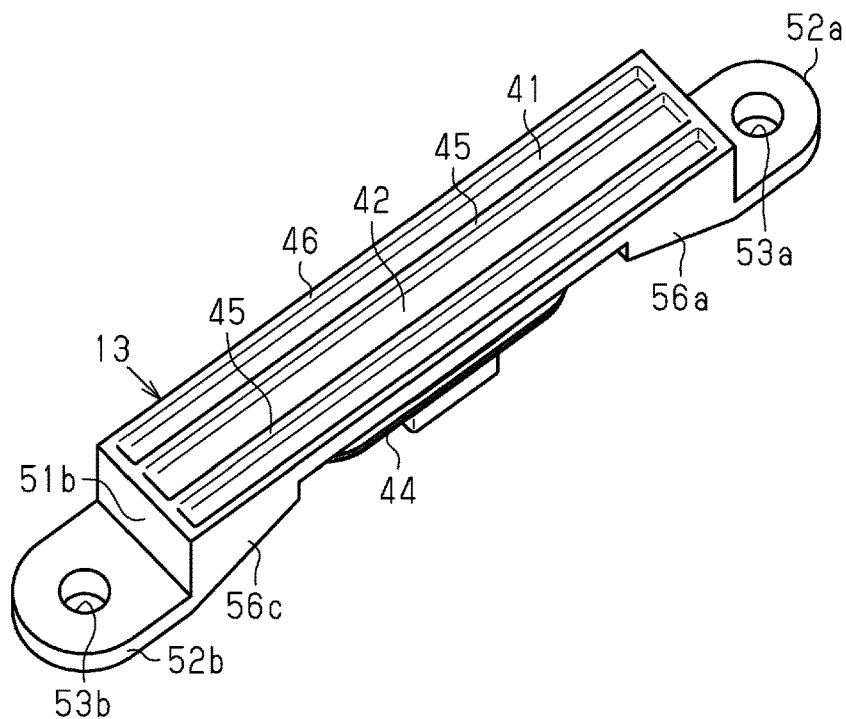
FIG. 2 is an exploded perspective view of the connector shown in FIG. 1.
Figure 2:
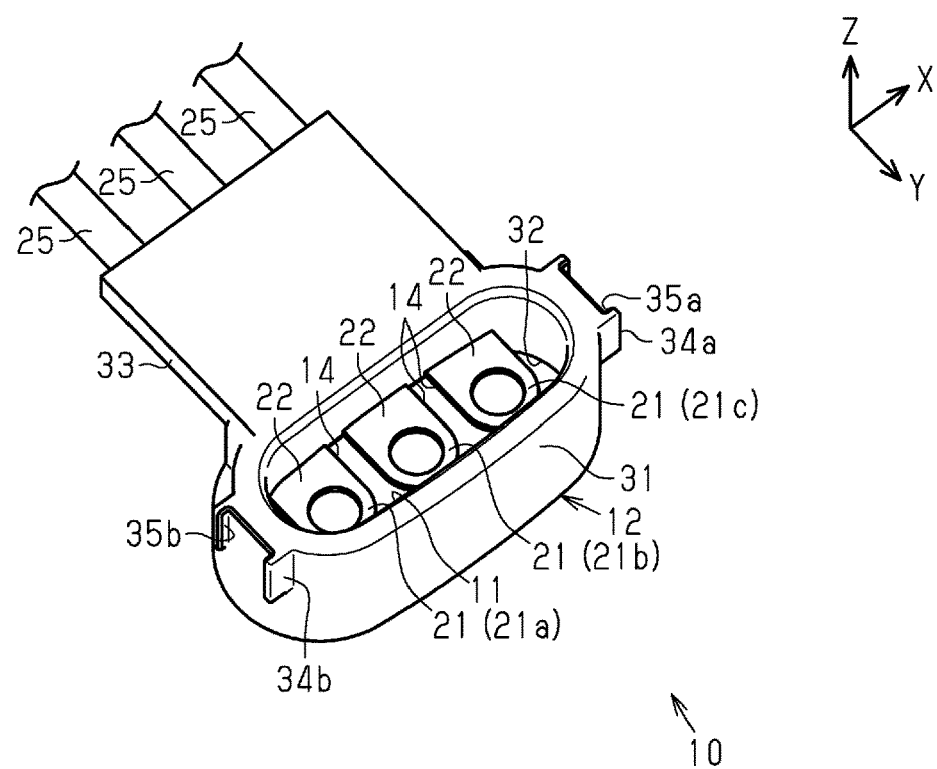

As shown in FIGS. 1 and 2, the connector 10 includes a connector housing 12 including an opening 11, a cover 13 closing the opening 11, and terminals 14 held by the connector housing 12. In the description hereafter, the connector housing 12 is referred to as the housing 12.

Terminal 14

Figure 7:
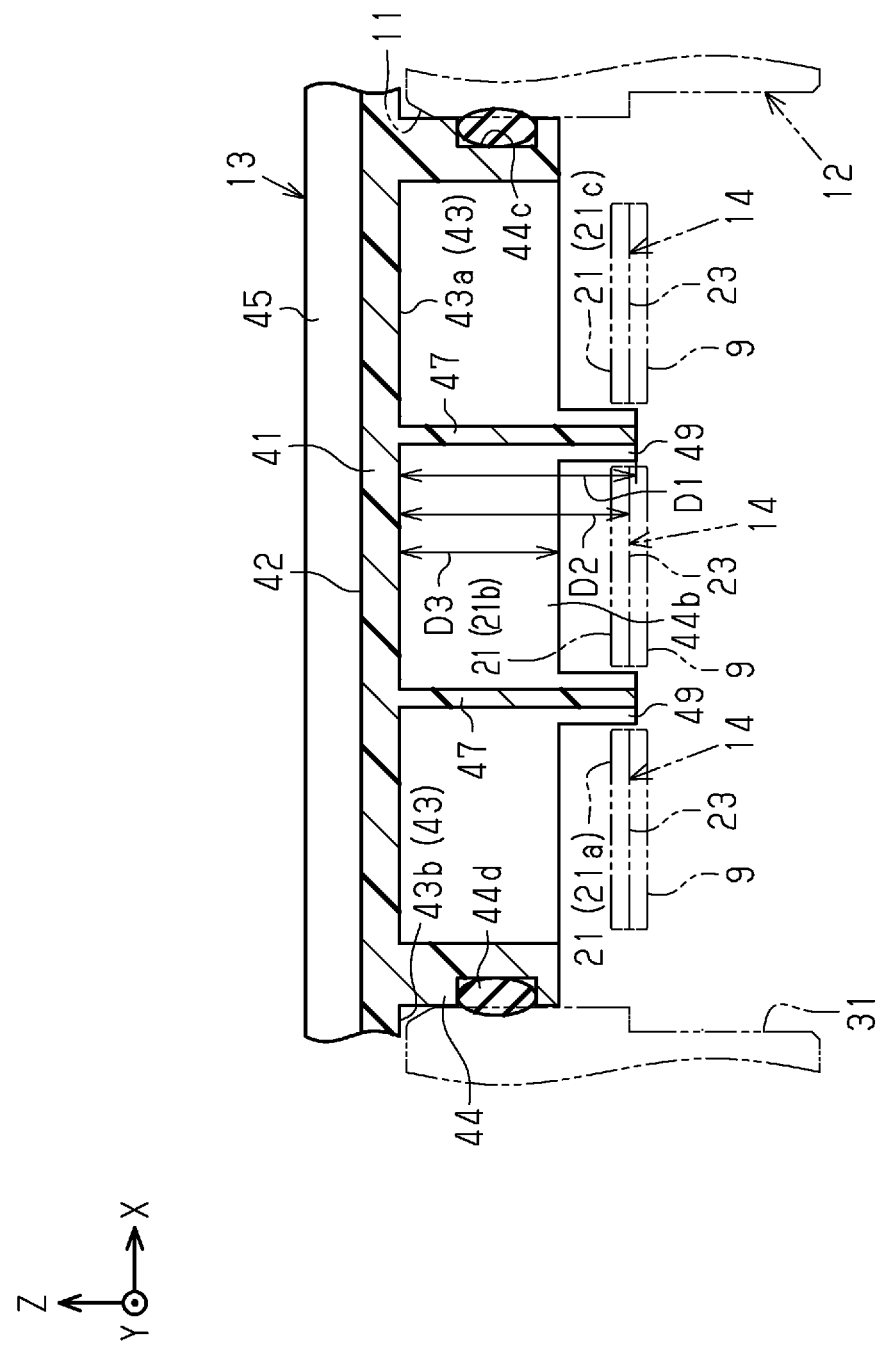
FIG. 7 is a cross-sectional view of the cover shown in FIG. 3.

As shown in FIGS. 2 and 7, in the present embodiment, the connector 10 includes three terminals 14, which are equal in number to the mate terminals 9. The number of the terminals 14 in the connector 10 is not limited to three and may be changed to any plural number. The terminals 14 are formed from a metal material. The material of the terminals 14 may be, for example, copper, a copper alloy, aluminum, an aluminum alloy, or other metal materials. Each of the terminals 14 is electrically connected to a different one of the mate terminals 9.

Each terminal 14 includes a connection part 21. Each connection part 21 is electrically connected to a different one of the mate terminals 9. The connection part 21 is a part of the terminal 14 arranged on the mate terminal 9. The terminal 14 includes the connection part 21 on an end of the terminal 14 projecting to an inner side of the housing 12. Each terminal 14 includes a terminal main body 22 held by the housing 12. In the terminal 14, the connection part 21 extends from an end of the terminal main body 22 that projects to the inner side of the housing 12. In the terminal 14, the connection part 21 includes two ends in a direction in which the connection part 21 projects from the terminal main body 22, and one of the two ends located farther from the terminal main body 22 defines a distal end of the connection part 21. Also, in the terminal 14, one of the two ends of the connection part 21, in a direction in which the connection part 21 projects from the terminal main body 22, located closer to the terminal main body 22 defines a basal end of the connection part 21.

In the present embodiment, the connection parts 21 of the terminals 14 are identical in shape to each other. In an example, the connection part 21 has the form of a plate including a through hole. The connection part 21 includes a connection surface 23 that contacts a corresponding one of the mate terminals 9. In an example, the connection surface 23 is a side surface of the connection part 21 in a thickness-wise direction of the connection part 21.

The connection parts 21 are arranged in a line in the housing 12. In an example, the connection parts 21 are arranged in a line so that the connection surfaces 23 of the connection parts 21 are coplanar with each other. The connection parts 21 are arranged so that the directions extending from the basal ends to the distal ends of the connection parts 21 are parallel to each other. Adjacent ones of the connection parts 21 are separated in a direction in which the connection parts 21 are arranged.

The arrangement direction of the connection parts 21 refers to a first direction X. The first direction X may refer to the direction indicated by the arrow of the x-axis in the drawings. When the three connection parts 21 are referred to as the connection parts 21a to 21c, the connection parts 21a to 21c are arranged in the order of the connection part 21a, the connection part 21b, and the connection part 21c in the first direction X. The direction extending from the basal end toward the distal end of the connection part 21 is referred to as a second direction Y. The second direction Y is a direction intersecting the first direction X. More specifically, when the directions extending from the basal ends to the distal ends of the connection parts 21 are parallel to each other, the direction extending from the basal end toward the distal end of each connection part 21 as viewed in the first direction X is referred to as the second direction Y. A direction that is orthogonal to the first direction X and the second direction Y is referred to as a third direction Z. In an example, as viewed in the first direction X, when the second direction Y extends from the left toward the right, the third direction Z extends from the lower side to the upper side. In the description hereafter, the first direction X, the second direction Y, and the third direction Z refer to the first direction X, the second direction Y, and the third direction Z in the connector 10 in an assembled state.

Electric wires 25 are separately and electrically connected to the terminals 14. Each electric wire 25 is electrically connected to a part of the terminal 14 that is separated from the connection part 21. In an example, the electric wire 25 is a coated wire that includes a core wire, which is formed of a conductor and an insulating cover, which covers the circumference of the core wire. The electric wire 25 includes an end connected to the terminal 14 and the opposite end electrically connected to an electrical device differing from the electrical device that is electrically connected to the connector 10 by the terminal mount. The opposite end of the electric wire 25 from the end connected to the terminal 14 is electrically connected to, for example, an inverter that generates alternating-current power from direct current power of a battery. Alternatively, the end of the electric wire 25 may be electrically connected to an electrical device differing from an inverter.

Connector Housing 12

In an example, the housing 12 is a resin mold component. In an example, the terminals 14 are partially disposed in the resin forming the housing 12 through insert molding so that the housing 12 holds the terminals 14. Alternatively, the terminals 14 may be formed separately from the housing 12 and then fixed to the housing 12.

The housing 12 includes a housing main body 31 in which the connection parts 21a to 21c are disposed. The housing main body 31 is tubular. In an example, as viewed in an axial direction of the housing main body 31, the housing main body 31 has a low-profile shape such that the housing main body 31 is elongated in the first direction X and is short in the second direction Y. The ends of the terminals 14 including the connection parts 21a to 21c project from an inner circumferential surface of the housing main body 31 to the cavity located at an inner side of the housing main body 31. In the present embodiment, the thickness-wise direction of the connection parts 21a to 21c is parallel to the axial direction of the housing main body 31.

The housing main body 31 includes the opening 11. The housing main body 31 includes the opening 11 located in an end of the housing main body 31 in the third direction Z. In an example, the opening 11 corresponds to one of two axial end openings in the housing main body 31. In the housing main body 31, the opening opposite to the opening 11 is an insertion opening 32 that is disposed in the terminal mount or the case.

As shown in FIGS. 1 and 2, the housing 12 may include an electric wire holder 33 that holds the ends of the electric wires 25 electrically connected to the terminals 14. In an example, the electric wire holder 33 is formed integrally with the housing main body 31. The electric wire holder 33 projects from the housing main body 31 to an outer side of the housing main body 31. Portions of the electric wires 25 and the terminals 14 electrically connected to each other are held inside the electric wire holder 33.

The housing 12 may include first guides 34a and 34b extending in the third direction Z from two ends of the housing 12 located at opposite sides in the first direction X.

The housing main body 31 includes a first end in the first direction X. The first guide 34a projects from the first end in the first direction X and extends in the third direction Z. The first guide 34a includes a guide recess 35a. The guide recess 35a is recessed in a direction opposite to the first direction X from a distal surface of the first guide 34a in the first direction X. The guide recess 35a extends through the first guide 34a in the third direction Z. In an example, the guide recess 35a has a quadrangular cross section that is cut along a plane orthogonal to the third direction Z. The cross-sectional shape of the guide recess 35a, which is cut along the plane orthogonal to the third direction Z, is not limited to a quadrangle and may be any shape, such as a semicircle. The cross sectional shape of the first guide 34a that is cut along the plane orthogonal to the third direction Z is uniform in the third direction Z.

The housing main body 31 includes a second end in the first direction X. The first guide 34b projects from the second end in the opposite direction of the first guide 34a and extends in the third direction Z. The first guide 34b includes a guide recess 35b. The guide recess 35b is recessed in the first direction X from a distal surface of the first guide 34b, which is located in the opposite direction of the first direction X. The guide recess 35b extends through the first guide 34b in the third direction Z. In an example, the guide recess 35b has a quadrangular cross section that is cut along a plane orthogonal to the third direction Z. The cross sectional shape of the guide recess 35b, which is cut along the plane orthogonal to the third direction Z, is not limited to a quadrangle and may be any shape such as a semicircle. The cross sectional shape of the first guide 34b that is cut along the plane orthogonal to the third direction Z is uniform in the third direction Z.

Cover 13

In an example, the cover 13 is a resin mold component. In an example, the cover 13 is formed from a resin material having a lower conductivity than the terminals 14. The cover 13 includes a closing portion 41 that closes the opening 11. The closing portion 41 has the form of a plate that is larger than the opening 11 as viewed in the third direction Z. In an example, the closing portion 41 has the form of a plate such that the dimension in the first direction X is larger than the dimension in the second direction Y (width). The cover 13 is disposed on the housing 12 so that the opening 11 is covered by the closing portion 41. When the cover 13 is disposed on the housing 12, the thickness-wise direction of the closing portion 41 conforms to the third direction Z. In the cover 13, the thickness-wise direction of the closing portion 41 also conforms to the axial direction of the housing main body 31. However, the thickness-wise direction of the closing portion 41 does not necessarily have to exactly conform to the third direction Z. Also, the thickness-wise direction of the closing portion 41 does not necessarily have to exactly conform to the axial direction of the housing main body 31.

Figure 3:
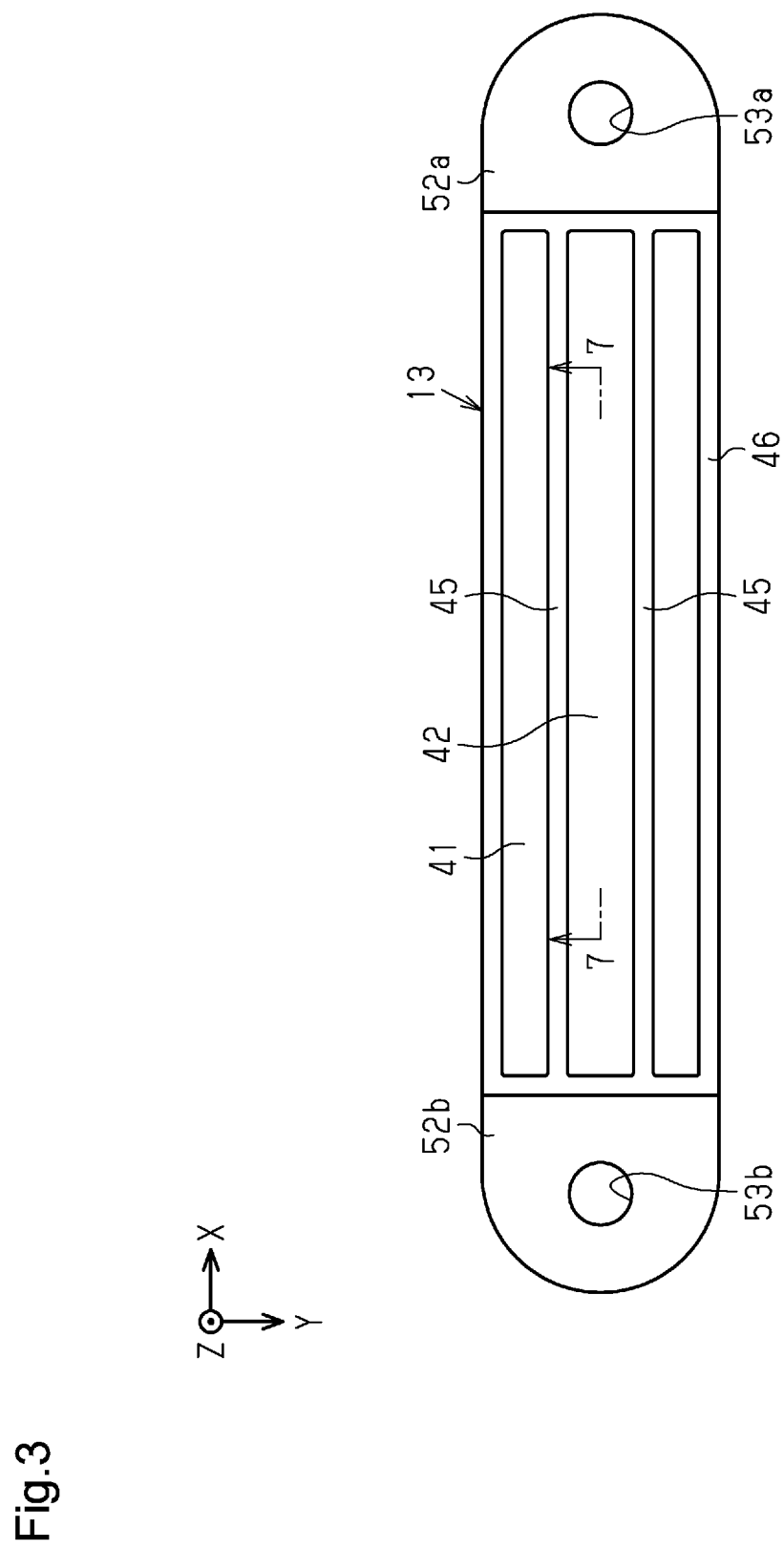
FIG. 3 is a plan view of a cover in the embodiment shown in FIG. 1.

As shown in FIG. 7, the cover 13 includes a first surface 42 exposed outside the housing 12 and a second surface 43 located at a rear side of the first surface 42. FIG. 7 is a cross-sectional view taking along line 7-7 in FIG. 3 showing a cross section of the cover 13 that is cut along a plane orthogonal to the second direction Y.

In an example, the first surface 42 is a side surface of the closing portion 41 located at a side opposite to the opening 11. The first surface 42 is planar and orthogonal to the third direction Z. The first surface 42 does not necessarily have to be exactly orthogonal to the third direction Z.

In an example, the second surface 43 is a side surface of the closing portion 41 located at the rear of the first surface 42. The second surface 43 faces the opening 11. The second surface 43 includes an exposed surface 43a exposed from the opening 11 to an inner side of the housing 12. The second surface 43 may extend from the exposed surface 43a in opposite directions along the first direction X. In an example, the second surface 43 includes the exposed surface 43a and a non-facing surface 43b that is located around the exposed surface 43a and does not face the opening 11. The second surface 43 is planar and orthogonal to the third direction Z. The second surface 43 does not necessarily have to be exactly orthogonal to the third direction Z. In an example, the exposed surface 43a and the non-facing surface 43b are coplanar with each other. However, the exposed surface 43a and the non-facing surface 43b may be located at different positions in the third direction Z. The second surface 43 may include only the exposed surface 43a.

As shown in FIGS. 4 to 7, the cover 13 may include a sealing portion 44 projecting from the second surface 43 to surround the exposed surface 43a as viewed in the third direction Z. The sealing portion 44 may be fitted into the opening 11. The sealing portion 44 is tubular and projects from the second surface 43 and extends in a direction opposite to the third direction Z. The sealing portion 44 is slightly smaller than the inner circumferential surface of the housing main body 31 as viewed in the third direction Z so that the sealing portion 44 is fitted into the housing main body 31 from the opening 11. Thus, in the present embodiment, as viewed in the third direction Z, the sealing portion 44 has a low-profile shape such that the sealing portion 44 is elongated in the first direction X and is short in the second direction Y. As viewed in the third direction Z, the exposed surface 43a is a part of the second surface 43 located inward from the sealing portion 44.

The sealing portion 44 includes side walls 44a and 44b facing each other in the second direction Y. The side wall 44a defines a first end of the sealing portion 44 in the second direction Y. The side wall 44b defines a second end of the sealing portion 44 in the second direction Y. The side walls 44a and 44b extend in the first direction X as viewed in the third direction Z.

The sealing portion 44 may include a sealing groove 44c extending in an outer circumferential surface of the sealing portion 44. In an example, the sealing groove 44c extends annularly as viewed in the third direction Z. The sealing groove 44c is open toward the outer circumference of the sealing portion 44.

The cover 13 may include an annular sealant 44d sealing a gap between the housing 12 and the outer surface of the sealing portion 44 that faces the housing 12. In an example, the sealant 44d seals the gap between the outer surface of the sealing portion 44 and the inner surface of the housing main body 31 opposed to the outer surface of the sealing portion 44. In an example, the sealant 44d is disposed in the sealing groove 44c. In an example, a rubber ring may be used as the sealant 44d. Besides a rubber ring, the sealant 44d may be any annular sealant that extends around the outer circumference of the sealing portion 44. When the sealing portion 44 is fitted into the housing main body 31, the sealant 44d is in hermetical contact with the inner surface of the housing main body 31 and an inner wall surface of the sealing groove 44c. When liquid such as water enters the inside of the housing main body 31 from the opening 11, the sealant 44d limits movement of the liquid toward the terminal mount to which the connector 10 is connected.

As shown in FIGS. 1 to 4 and 7, the cover 13 includes at least one first reinforcement rib 45 projecting from the first surface 42. In the present embodiment, the cover 13 includes two first reinforcement ribs 45. The number of first reinforcement ribs 45 is not limited to two, and the cover 13 may include one or three or more first reinforcement ribs 45.

Each first reinforcement rib 45 projects from the first surface 42 in the third direction Z, that is, in a direction away from the opening 11. The first reinforcement rib 45 also extends in the first direction X as viewed in the third direction Z. In an example, the first reinforcement rib 45 extends from a first end to a second end of the first surface 42 in the first direction X. In other words, the first reinforcement rib 45 extends from a first end to a second end of the closing portion 41 in the first direction X. The first reinforcement ribs 45 are integrated with the closing portion 41. The two first reinforcement ribs 45 are separated in the second direction Y. For example, the two first reinforcement ribs 45 extend parallel to each other. The first reinforcement ribs 45 do not necessarily have to be parallel to each other as long as the first reinforcement ribs 45 extend in the first direction X as viewed in the third direction Z.

In an example, the first reinforcement rib 45 has a quadrangular cross section that is cut along a plane orthogonal to the first direction X. The shape of a cross section of the first reinforcement rib 45 cut along a plane orthogonal to the first direction X is not limited to a quadrangle and may be any shape projecting from the first surface 42. In an example, the cross-sectional shape of the first reinforcement rib 45 cut along a plane orthogonal to the first direction X may be a polygon including a quadrangle, a semicircle, or a partial cutaway circle.

The cover 13 may include a peripheral wall 46 projecting from the first surface 42 and extending along the peripheral edge of the first surface 42. In an example, the peripheral wall 46 annularly extends along the peripheral edge of the first surface 42. The term "annular" as used in this description may refer to any structure that forms a loop or a continuous shape with no ends. "Annular" shapes include but are not limited to a circular shape, an elliptic shape, and a polygonal shape with sharp or rounded corners.

The peripheral wall 46 projects from the first surface 42 in the third direction Z. In an example, the peripheral wall 46 has the form of a frame such that the dimension in the first direction X is larger than the dimension in the second direction Y as viewed in the third direction Z. The peripheral wall 46 is integrated with the closing portion 41. In an example, the peripheral wall 46 has a quadrangular cross section that is cut along a plane orthogonal to the direction in which the peripheral wall 46 extends. The shape of the cross section of the peripheral wall 46 is not limited to a quadrangle and may be any shape projecting from the first surface 42. In an example, the cross-sectional shape of the peripheral wall 46 may be a polygon including a quadrangle, a semicircle, or a partial cutaway circle.

In an example, as viewed in the third direction Z, the first reinforcement ribs 45 are located inward from the peripheral wall 46. Each first reinforcement rib 45 has opposite ends in the first direction X that are joined to the peripheral wall 46. More specifically, the first reinforcement rib 45 is integrated with the peripheral wall 46. In an example, the first reinforcement ribs 45 and the peripheral wall 46 project from the first surface 42 by the same length. The first reinforcement ribs 45 and the peripheral wall 46 may project from the first surface 42 by different lengths.

As shown in FIGS. 4 to 7, the cover 13 includes at least one second reinforcement rib 47 projecting from the second surface 43. In an example, the number of the second reinforcement ribs 47 included in the cover 13 is less than the number of the connection parts 21 by one. More specifically, in the present embodiment, since the connector 10 includes three terminals 14, the cover 13 includes two second reinforcement ribs 47. The number of the second reinforcement ribs 47 included in the cover 13 is not limited to two and may be any number that is greater than or equal to one. The number of the second reinforcement ribs 47 does not have to be less than the number of terminals 14 by one. In an example, when the connector 10 includes four or more terminals 14, the number of the second reinforcement ribs 47 may be less than the number of the terminals 14 by two.

In the present embodiment, the cover 13 is formed from a resin material having a lower conductivity than the terminals 14. Thus, the second reinforcement ribs 47 are less conductive than the terminals 14.

Each second reinforcement rib 47 projects from the second surface 43 in a direction opposite to the third direction Z, that is, in a direction away from the first surface 42. Also, as viewed in the third direction Z, the second reinforcement rib 47 extends in the second direction Y between adjacent ones of the connection parts 21. In an example, as viewed in the third direction Z, one second reinforcement rib 47 is disposed between each two of the connection parts 21 located adjacent to each other in the first direction X. In other words, as viewed in the third direction Z, the connection parts 21 are disposed at opposite sides of each second reinforcement rib 47 in the first direction X. More specifically, as viewed in the third direction Z, one of the second reinforcement ribs 47 is disposed between the connection part 21a and the connection part 21b, which are located adjacent to each other in the first direction X. In the same manner, as viewed in the third direction Z, one of the second reinforcement ribs 47 is disposed between the connection part 21b and the connection part 21c, which are located adjacent to each other in the first direction X.

In an example, each second reinforcement rib 47 projects from the exposed surface 43a in a direction opposite to the third direction Z. The second reinforcement ribs 47 are integrated with the closing portion 41. As viewed in the third direction Z, each second reinforcement rib 47 is flat and extends in the second direction Y. In an example, the second reinforcement rib 47 is flat and is orthogonal to the first direction X. However, the second reinforcement rib 47 does not necessarily have to be orthogonal to the first direction X. The two second reinforcement ribs 47 are separated in the first direction X. In an example, the two second reinforcement ribs 47 extend parallel to each other. The two second reinforcement ribs 47 do not necessarily have to be parallel to each other as long as the second reinforcement ribs 47 extend in the second direction Y as viewed in the third direction Z.

In an example, as viewed in the third direction Z, the second reinforcement ribs 47 are located inward from the outer circumferential surface of the sealing portion 44. In an example, each second reinforcement rib 47 has opposite ends in the second direction Y that are joined to the sealing portion 44. More specifically, the second reinforcement rib 47 includes a first end in the second direction Y joined to the side wall 44*a*. The second reinforcement rib 47 includes a second end in the second direction Y joined to the side wall 44*b*. Thus, the second reinforcement ribs 47 may be integrated with the sealing portion 44.

As shown in FIG. 7, each second reinforcement rib 47 projects from the second surface 43 beyond the connection parts 21. More specifically, distance D1 between the second surface 43 and the distal end of the second reinforcement rib 47 in the third direction Z is greater than distance D2 between the second surface 43 and each connection surface 23 in the third direction Z. Thus, the second reinforcement rib 47 is disposed between each ones of the connection parts 21 located adjacent to each other in the first direction X. In an example, in the first direction X, one of the second reinforcement ribs 47 is disposed between the connection part 21*a* and the connection part 21*b*, which are located adjacent to each other. In an example, when the connector 10 is viewed in any of the second direction Y and the third direction Z, the second reinforcement ribs 47 are disposed between the connection parts 21 located adjacent to each other in the first direction X.

The at least one second reinforcement rib 47 may be greater than the sealing portion 44 in a length of projection from the second surface 43. In an example, each second reinforcement rib 47 is greater than the sealing portion 44 in a length of projection from the second surface 43. Thus, the second reinforcement rib 47 is greater than the sealing portion 44 in a length of projection from the second surface 43 in a direction opposite to the third direction Z. Therefore, distance D1 is greater than distance D3 that is between the second surface 43 and the distal end of the sealing portion 44 in the third direction Z. The two second reinforcement ribs 47 may be equal in the length of projection from the second surface 43. The second reinforcement ribs 47 may differ in the length of projection from the second surface 43.

As shown in FIGS. 4 to 7, the cover 13 may include at least one joint rib 48 that joins ones of the second reinforcement ribs 47 that are located adjacent to each other in the first direction X. The "second reinforcement ribs 47 that are located adjacent to each other in the first direction X" refers to second reinforcement ribs 47 located next to each other in the first direction X when only the second reinforcement ribs 47 are focused on. In an example, the cover 13 includes one joint rib 48. The joint rib 48 joins the two second reinforcement ribs 47 located at opposite sides of the connection part 21*b* as viewed in the third direction Z. More specifically, as viewed in the third direction Z, the joint rib 48 joins the second reinforcement rib 47 that is disposed between the connection part 21*a* and the connection part 21*b* and the second reinforcement rib 47 that is disposed between the connection part 21*b* and the connection part 21*c*.

The joint rib 48 is located closer to the connection parts 21 than the second surface 43 in the third direction Z. As viewed in the third direction Z, the joint rib 48 extends in the first direction X. In an example, the joint rib 48 is disposed on a distal surface of the side wall 44*a*. The joint rib 48 projects from the distal surface of the side wall 44*a* in a direction opposite to the third direction Z. The joint rib 48 joints the first ends, in the second direction Y, of the two second reinforcement ribs 47 located adjacent to each other in the first direction X. The joint rib 48 is integrated with the sealing portion 44 and the two second reinforcement ribs 47 joined by the joint rib 48. The distal end of the joint rib 48 and the distal end of the second reinforcement rib 47 may be located at the same position in the third direction Z. The distal end of the joint rib 48 and the distal end of the second reinforcement rib 47 may be located at different positions in the third direction Z.

The cover 13 may include at least one auxiliary rib 49 integrated with the second reinforcement ribs 47. The auxiliary rib 49 is integrated with the second end of the second reinforcement rib 47 in the second direction Y. In an example, the auxiliary rib 49 may be disposed on each of the second reinforcement ribs 47. Each auxiliary rib 49 extends in the first direction X as viewed in the third direction Z. Each auxiliary rib 49 and the second reinforcement rib 47 that is integrated with the auxiliary rib 49 are T-shaped as viewed in the third direction Z. In an example, the auxiliary rib 49 is disposed on a distal surface of the side wall 44*b*. The auxiliary rib 49 projects from the distal surface of the side wall 44*b* in a direction opposite to the third direction Z. The auxiliary rib 49 is integrated with the sealing portion 44. The distal end of the auxiliary rib 49 and the distal end of the second reinforcement ribs 47 may be located at the same position in the third direction Z. The distal end of the auxiliary rib 49 and the distal end of the second reinforcement rib 47 may be located at different positions in the third direction Z.

Figure 4:
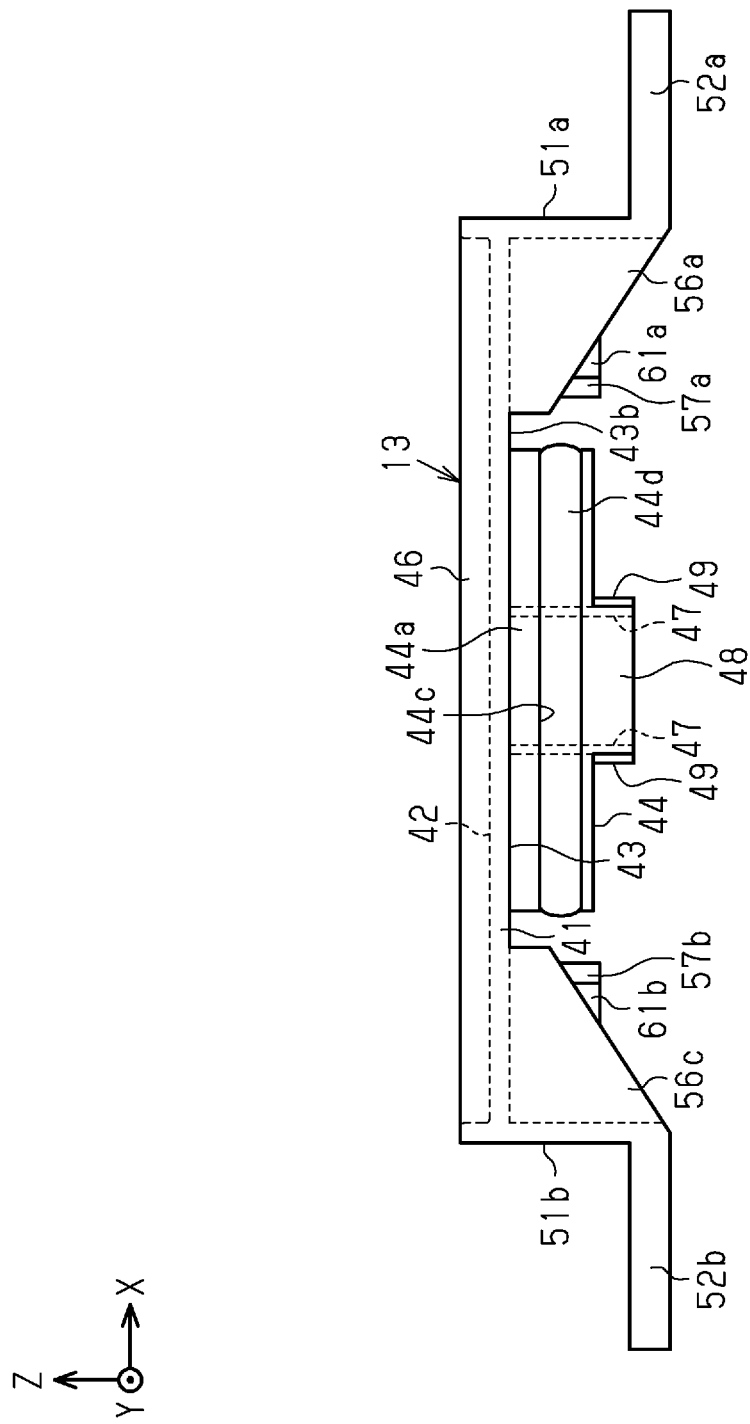
FIG. 4 is a side view of the cover shown in FIG. 3.
Figure 5:
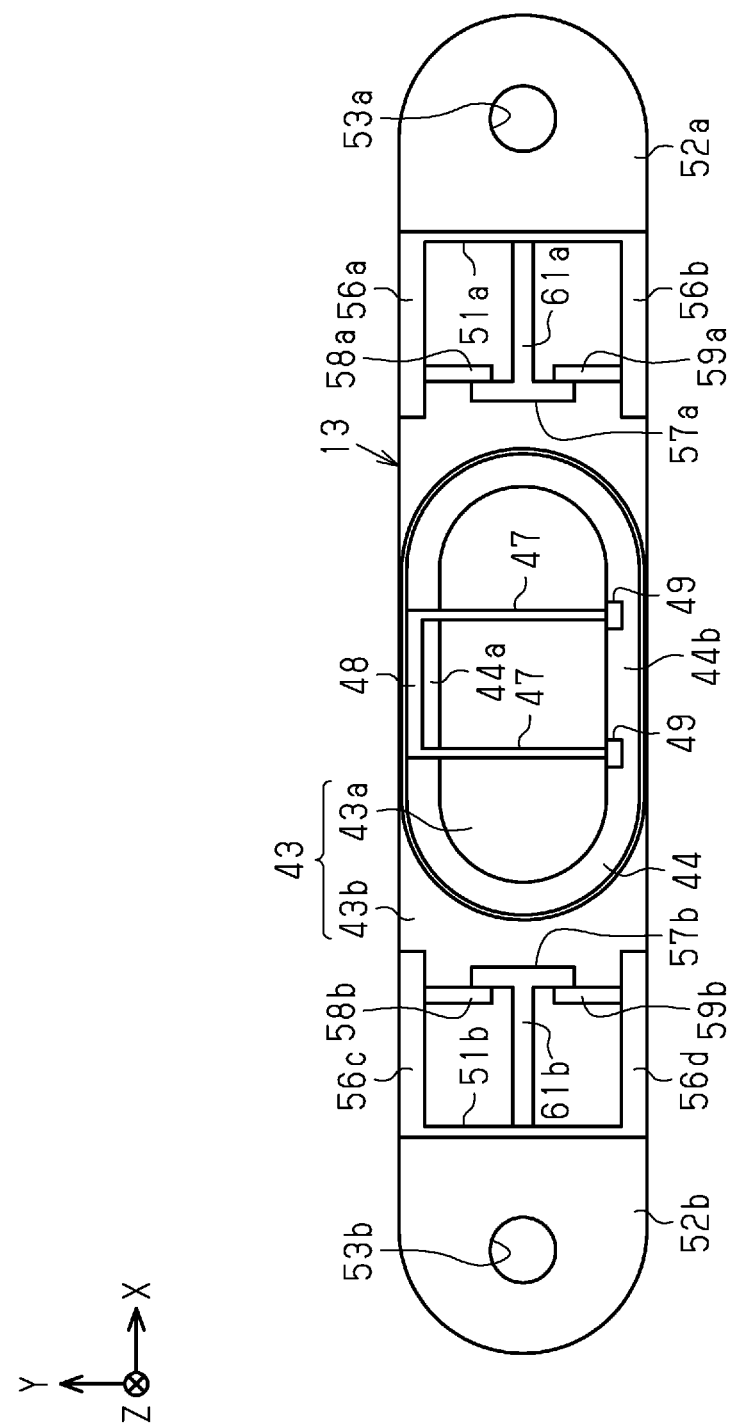
FIG. 5 is a lower view of the cover shown in FIG. 3.
Figure 6:
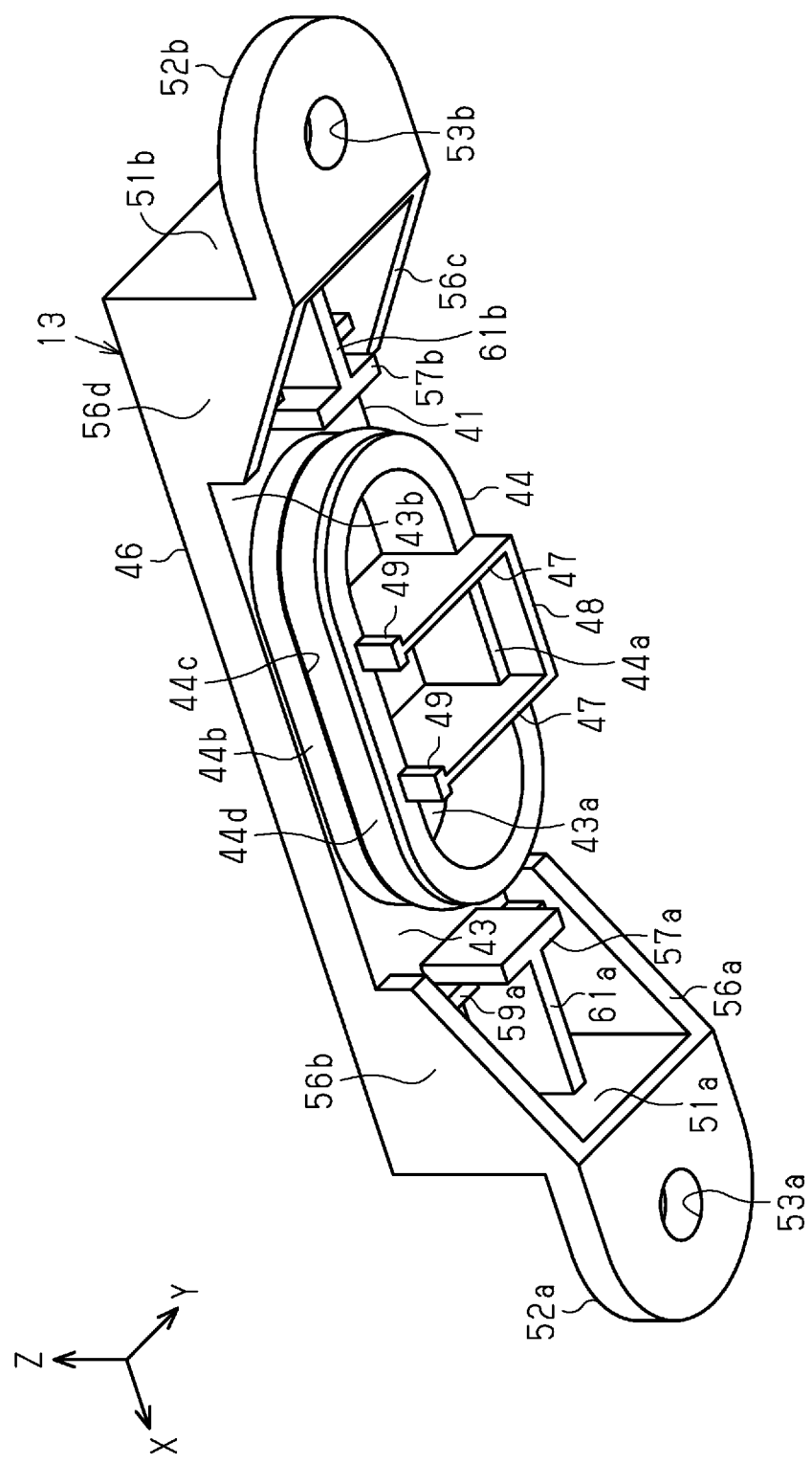
FIG. 6 is a perspective view of the cover shown in FIG. 3.

As shown in FIGS. 4 to 6, the cover 13 may include a projection wall 51*a* in a first end region of the cover 13 in the first direction X. The cover 13 may also include a projection wall 51*b* in a second end region of the cover 13 in the first direction X. The projection wall 51*a* projects from a portion of the second surface 43 separated from the exposed surface 43*a* in the first direction X. In an example, the projection wall 51*a* projects from the first end, in the first direction X, of the second surface 43 in a direction opposite to the third direction Z. The projection wall 51*b* projects from a portion of the second surface 43 separated from the exposed surface 43*a* in a direction opposite to the first direction X. In an example, the projection wall 51*b* projects from the second end, in the first direction X, of the second surface 43 in a direction opposite to the third direction Z. The projection walls 51*a* and 51*b* are integrated with the closing portion 41. In an example, the projection walls 51*a* and 51*b* are flat and orthogonal to the first direction X.

The cover 13 may include a fixing portion 52*a* projecting from the projection wall 51*a*. The cover 13 may also include a fixing portion 52*b* projecting from the projection wall 51*b*. The fixing portion 52*a* projects from a distal end of the projection wall 51*a* in the first direction X. The fixing portion 52*a* includes a fixing hole 53*a* extending through the fixing portion 52*a* in the third direction Z. The fixing portion 52*b* projects from a distal end of the projection wall 51*b* in a direction opposite to the first direction X. The fixing portion 52*b* includes a fixing hole 53*b* extending through the fixing portion 52*b* in the third direction Z.

The cover 13 may include rib walls 56*a* and 56*b* projecting from the second surface 43 and integrated with the projection wall 51*a*. Also, the cover 13 may include rib walls 56*c* and 56*d* projecting from the second surface 43 and integrated with the projection wall 51*b*.

As viewed in the third direction Z, the rib walls 56*a* and 56*b* are located at a position separated from the exposed surface 43*a* in the first direction X. The rib wall 56*a* projects from the first end, in the second direction Y, of the second surface 43 in a direction opposite to the third direction Z.

The rib wall 56b projects from the second end, in the second direction Y, of the second surface 43 in a direction opposite to the third direction Z. The rib wall 56a includes a first end in the first direction X that is joined to the projection wall 51a. The rib wall 56b includes a first end in the first direction X that is joined to the projection wall 51a. In an example, the rib walls 56a and 56b are flat and orthogonal to the second direction Y. Each of the rib walls 56a and 56b projects from the second surface 43 by a length that decreases as the projection wall 51a becomes farther in a direction opposite to the first direction X.

As viewed in the third direction Z, the rib walls 56c and 56d are located at a position separated from the exposed surface 43a in a direction opposite to the first direction X. The rib wall 56c projects from the first end, in the second direction Y, of the second surface 43 in a direction opposite to the third direction Z. The rib wall 56d projects from the second end, in the second direction Y, of the second surface 43 in a direction opposite to the third direction Z. The rib wall 56c includes a second end in the first direction X that is joined to the projection wall 51b. The rib wall 56d includes a second end in the first direction X that is joined to the projection wall 51b. In an example, the rib walls 56c and 56d are flat and orthogonal to the second direction Y. Each of the rib walls 56c and 56d projects from the second surface 43 by a length that decreases as the projection wall 51b becomes farther in the first direction X.

As shown in FIGS. 2 and 4 to 6, the cover 13 may include second guides 57a and 57b respectively projecting from a portion of the second surface 43 separated from the exposed surface 43a in the first direction X and a portion of the second surface 43 separated from the exposed surface 43a in a direction opposite to the first direction X. The second guide 57a projects in a direction opposite to the third direction Z from a portion of the non-facing surface 43b separated from the exposed surface 43a in the first direction X. The second guide 57a is located at a position where the second guide 57a is fitted into the guide recess 35a in a direction opposite to the third direction Z when the cover 13 is disposed on the housing 12. The second guide 57b projects in a direction opposite to the third direction Z from a portion of the non-facing surface 43b separated from the exposed surface 43a in a direction opposite to the first direction X. The second guide 57b is located at a position where the second guide 57b is fitted into the guide recess 35b in a direction opposite to the third direction Z when the cover 13 is disposed on the housing 12.

The shape of the second guide 57a is in conformance with the shape of wall surfaces of the guide recess 35a. In an example, the second guide 57a and the guide recess have a quadrangular cross section that is cut along a plane orthogonal to the third direction Z and is similar to each other. The shape of a cross section of the second guide 57a cut along a plane orthogonal to the third direction Z is not limited to a quadrangle and may be changed in accordance with the shape of a cross section of the guide recess 35a cut along a plane orthogonal to the third direction Z.

The shape of the second guide 57b is in conformance with the shape of wall surfaces of the guide recess 35b. In an example, the second guide 57b and the guide recess have a quadrangular cross section that is cut along a plane orthogonal to the third direction Z and is similar to each other. The shape of a cross section of the second guide 57b cut along a plane orthogonal to the third direction Z is not limited to a quadrangle and may be changed in accordance with the shape of a cross section of the guide recess 35b cut along a plane orthogonal to the third direction Z.

In an example, as viewed in the third direction Z, the second guides 57a and 57b extend in the second direction Y. The second guides 57a and 57b may be flat and orthogonal to the first direction X. The second guides 57a and 57b do not have to be exactly orthogonal to the first direction X.

When the cover 13 is disposed on the housing 12, the second guide 57a is fitted into the guide recess 35a in a direction opposite to the third direction Z. Thus, the second guide 57a and the first guide 34a are fitted using a recess and a projection. When the cover 13 is disposed on the housing 12, the second guide 57b is fitted into the guide recess 35b in a direction opposite to the third direction Z. Thus, the second guide 57b and the first guide 34b are fitted using a recess and a projection. The recess-projection fitting of the second guides 57a and 57b to the first guides 34a and 34b restricts misalignment of the housing 12 with the cover 13 in the first direction X and the second direction Y.

As shown in FIGS. 4 to 6, the cover 13 may include first reinforcement parts 58a and 58b extending on the second surface 43 from the second guides 57a and 57b to a first end of the cover 13 in the second direction Y. The cover 13 may also include second reinforcement parts 59a and 59b extending on the second surface 43 from the second guides 57a and 57b to a second end of the cover 13 in the second direction Y.

The first reinforcement part 58a and the second reinforcement part 59a project from a portion of the second surface 43 separated from the exposed surface 43a in the first direction X. More specifically, the first reinforcement part 58a and the second reinforcement part 59a project in a direction opposite to the third direction Z from a portion of the non-facing surface 43b separated from the exposed surface 43a in the first direction X. As viewed in the third direction Z, the first reinforcement part 58a and the second reinforcement part 59a extend in the second direction Y. In an example, the first reinforcement part 58a and the second reinforcement part 59a are flat and are orthogonal to the first direction X. The first reinforcement part 58a and the second reinforcement part 59a do not have to be exactly orthogonal to the first direction X. The first reinforcement part 58a includes a second end in the second direction Y joined to the second guide 57a. The first reinforcement part 58a includes a first end in the second direction Y joined to the rib wall 56a. The second reinforcement part 59a includes a first end in the second direction Y joined to the second guide 57a. The second reinforcement part 59a includes a second end in the second direction Y joined to the rib wall 56b.

The first reinforcement part 58b and the second reinforcement part 59b project from a portion of the second surface 43 separated from the exposed surface 43a in a direction opposite to the first direction X. More specifically, the first reinforcement part 58b and the second reinforcement part 59b project in a direction opposite to the third direction Z from a portion of the non-facing surface 43b separated from the exposed surface 43a in a direction opposite to the first direction X. As viewed in the third direction Z, the first reinforcement part 58b and the second reinforcement part 59b extend in the second direction Y. In an example, the first reinforcement part 58b and the second reinforcement part 59b are flat and are orthogonal to the first direction X. The first reinforcement part 58b and the second reinforcement part 59b do not have to be exactly orthogonal to the first direction X. The first reinforcement part 58b includes a second end in the second direction Y joined to the second guide 57b. The first reinforcement part 58b includes a first end in the second direction Y joined to the rib wall 56c. The second reinforcement part 59b includes a first end in the second direction Y joined to the second guide 57b. The second reinforcement part 59b includes a second end in the second direction Y joined to the rib wall 56d.

The cover 13 may include third reinforcement ribs 61a and 61b projecting from the second surface 43. The third reinforcement rib 61a extends from the second guide 57a to the projection wall 51a. The third reinforcement rib 61a includes a second end in the first direction X joined to the second guide 57a. The third reinforcement rib 61a includes a first end in the first direction X joined to the projection wall 51a. The third reinforcement rib 61b extends from the second guide 57b in the projection wall 51b. The third reinforcement rib 61b includes a first end in the first direction X joined to the second guide 57b. The third reinforcement rib 61b includes a second end in the first direction X joined to the projection wall 51b. As viewed in the third direction Z, the third reinforcement ribs 61a and 61b extend in the first direction X. In an example, the third reinforcement ribs 61a and 61b are flat and orthogonal to the second direction Y. The third reinforcement ribs 61a and 61b do not have to be exactly orthogonal to the second direction Y.

Connection of Connector 10 to Terminal Mount

As shown in FIGS. 2 and 7, when connecting the connector 10 to a terminal mount, a person first disposes the housing 12 on the terminal mount. At this time, the housing 12 is not disposed on the cover 13, and the opening 11 is not closed by the cover 13. Subsequently, a tool is inserted into the housing 12 from the opening 11 to electrically connect the terminals 14 to the mate terminals 9. In an example, the terminal 14 is electrically connected to the mate terminal 9 by a bolt, inserted into the terminal 14 and the mate terminal 9, and a nut, fastened to the bolt.

Then, as shown in FIGS. 2, 6, and 7, the cover 13 is disposed on the housing 12 to close the opening 11 with the cover 13. When the cover 13 is disposed on the housing 12, the sealing portion 44 is fitted into the housing main body 31 from the opening 11. At this time, the second guide 57a and the second guide 57b are fitted into the guide recess 35a of the first guide 34a and the guide recess 35b of the first guide 34b in a direction opposite to the third direction Z. This positions the cover 13 on the housing 12 in the first direction X, the direction opposite to the first direction X, the second direction Y, and the direction opposite to the second direction Y. In addition, when the cover 13 is coupled to the housing 12, inclination of the cover 13 from the housing 12 is limited. More specifically, when the cover 13 is coupled to the housing 12, inclination of the axial direction of the housing main body 31 from the axial direction of the sealing portion 44 is limited.

When the cover 13 is disposed on the housing 12, the sealing portion 44 is fitted into the housing main body 31. The second reinforcement ribs 47 are each disposed between the connection parts 21 located adjacent to each other in the first direction X. Subsequently, the cover 13 is fixed to a case of the electrical device using the fixing hole 53a and a bolt that is inserted into the fixing hole 53b and is not shown in the drawings. This completes connection of the connector 10 to the terminal mount.

The operation of the present embodiment will now be described.

When the pressure of a case is increased by heat generated from the electrical device or the like, the pressure applied to the cover 13 from the inside of the case will be increased. In this case, the cover 13 receives an external force from the inside of the case acting to push the cover 13 outward from the case. More specifically, the cover 13 receives an external force acting to push the exposed surface 43a outward from the case, that is, outward from the housing 12. In this regard, in the present embodiment, the cover 13 includes the first reinforcement ribs 45, projecting from the first surface 42, and the second reinforcement ribs 47, projecting from the second surface 43. As viewed in the third direction Z, the first reinforcement ribs 45 and the second reinforcement ribs 47 extend in directions intersecting each other. This increases the rigidity of the cover 13. Thus, deformation of the cover 13 is restricted.

The advantages of the present embodiment will now be described.

(1) The connector 10 includes the housing 12 including the opening 11, the cover 13 closing the opening 11, and the terminals 14 held by the housing 12. Each terminal 14 includes a connection part 21. Each connection part 21 is electrically connected to a different one of the mate terminals 9. The connection parts 21 are arranged in a line in the housing 12. The cover 13 includes the first surface 42, exposed outside the housing 12, and the second surface 43 located at the rear side of the first surface 42 and including the exposed surface 43a, exposed from the opening 11 to the inner side of the housing 12. The cover 13 further includes the two first reinforcement ribs 45 projecting from the first surface 42 and the two second reinforcement ribs 47 projecting from the second surface 43. The first direction X refers to the direction in which the connection parts 21 are arranged. The second direction Y refers to a direction intersecting the first direction X and extending from the basal end to the distal end of each connection part 21. The third direction Z refers to a direction orthogonal to the first direction X and the second direction Y. The first reinforcement ribs 45 extend in the first direction X. As viewed in the third direction Z, the second reinforcement ribs 47 each extend in the second direction Y between adjacent ones of the connection parts 21.

With this structure, the cover 13 includes the first reinforcement ribs 45 and the second reinforcement ribs 47, respectively arranged on the two surfaces, namely, the first surface 42 and the second surface 43 located at the rear side of the first surface 42. The first reinforcement ribs 45 project from the first surface 42 and extend in the first direction X. The second reinforcement ribs 47 project from the second surface 43 and extend in the second direction Y, which intersects the first direction X. This increases the rigidity of the cover 13 as compared to a structure in which only one of the first surface 42 and the second surface 43 includes reinforcement ribs or a structure in which the first reinforcement ribs and the second reinforcement ribs extend in the same direction. Thus, when the cover 13 receives an external force, deformation of the cover 13 is restricted.

The restriction of deformation of the cover 13 limits formation of a gap between the cover 13 and the housing 12 around the opening 11. As a result, even when the temperature becomes high in the inside of the case accommodating the electrical device to which the connector 10 is electrically connected by the terminal mount, entrance of liquid such as water into the housing 12 is limited. Ultimately, entrance of the liquid such as water into the case is limited.

(2) The cover 13 includes the sealing portion 44 projecting from the second surface 43 to surround the exposed surface 43a as viewed in the third direction Z and fitted into the opening 11. Each second reinforcement rib 47 is greater than the sealing portion 44 in a length of projection from the second surface 43.

With this structure, the sealing portion 44 also increases the rigidity of the cover 13. Thus, deformation of the cover 13 is further restricted. The sealing portion 44, fitted into the opening 11, further decreases the gap between the sealing portion 44 and the inner circumferential edge of the opening 11. Thus, liquid such as water is less likely to enter the housing 12 from the opening 11.

In the present embodiment, the cover 13 includes the sealant 44*d* sealing a gap between the housing 12 and the outer surface of the sealing portion 44 that faces the housing 12. Thus, entrance of liquid such as water into the housing 12 from the opening 11 is limited by the sealant 44*d*.

(3) The cover 13 is a resin mold component. As viewed in any of the second direction Y and the third direction Z, the second reinforcement ribs 47 are disposed between the connection parts 21 located adjacent to each other in the first direction X.

This structure allows the second reinforcement ribs 47 to be elongated in the third direction Z as compared to a structure in which the second reinforcement ribs 47 are each disposed between the connection parts 21 located adjacent to each other in the first direction X as viewed in the third direction Z but are not disposed between the connection parts 21 located adjacent to each other in the first direction X as viewed in the second direction Y. Thus, the rigidity of the cover 13 is further increased. Accordingly, deformation of the cover 13 is further restricted.

The cover 13 is a resin mold component and thus may be formed from a resin material having a lower conductivity than the terminal 14. In an example, when the terminal 14 is connected to the mate terminal 9, at least one of the connection part 21 and the mate terminal 9 may be scraped and produce metal flakes. To inhibit formation of a short-circuit of the connection parts 21 located adjacent to each other in the first direction X because of the metal flakes, it is preferred that the connection parts 21 located adjacent to each other in the first direction X undergo an insulating process. When the cover 13 is a resin mold component formed from a resin material having a lower conductivity than the terminals 14, the second reinforcement ribs 47, which are part of the cover 13, are also formed from the resin material having a lower conductivity than the terminals 14. Thus, the conductivity of the second reinforcement ribs 47 is easily made lower than the conductivity of the terminals 14. Electrical insulation of the connection parts 21 located adjacent to each other in the first direction X is obtained by the second reinforcement ribs 47 disposed between the connection parts 21. This eliminates the need for a separate structure that inhibits the short-circuiting of the connection parts 21 located adjacent to each other in the first direction X. As a result, the number of components of the connector 10 is reduced.

(4) The second surface 43 extends wider than the exposed surface 43*a* in opposite directions in the first direction. The housing 12 includes the first guides 34*a* and 34*b* extending in the third direction Z from two ends of the housing 12 located at opposite sides in the first direction X. The cover 13 includes the second guides 57*a* and 57*b* projecting from two parts of the second surface 43 located at outer sides of the exposed surface 43*a* in the first direction X. The recess-projection fitting of the second guides 57*a* and 57*b* to the first guides 34*a* and 34*b* restricts misalignment of the housing 12 with the cover 13 in the first direction X and the second direction Y.

With this structure, when the cover 13 is disposed on the housing 12, the first guides 34*a* and 34*b* are fitted to the second guides 57*a* and 57*b* using recesses and projections. Thus, the cover 13 is easily positioned on the housing 12 in the first direction X and the second direction Y. This facilitates the coupling of the cover 13 to the housing 12.

(5) The cover 13 includes the first reinforcement parts 58*a* and 58*b* extending on the second surface 43 from the second guides 57*a* and 57*b* to the first end of the cover 13 in the second direction Y. The cover 13 also includes the second reinforcement parts 59*a* and 59*b* extending on the second surface 43 from the second guides 57*a* and 57*b* to the second end of the cover 13 in the second direction Y.

With this structure, the rigidity of the cover 13 is increased by the second guides 57*a* and 57*b*, the first reinforcement parts 58*a* and 58*b*, and the second reinforcement parts 59*a* and 59*b*. As a result, deformation of the cover 13 is further restricted.

(6) The cover 13 includes the peripheral wall 46 projecting from the first surface 42 and extending along the peripheral edge of the first surface 42. With this structure, the rigidity of the cover 13 is further increased by the peripheral wall 46. As a result, deformation of the cover 13 is further restricted.

(7) The peripheral wall 46 annularly extends along the peripheral edge of the first surface 42. With this structure, including the annular peripheral wall 46, the rigidity of the cover 13 is more likely to be increased than with a structure in which the peripheral wall 46 is not annular. As a result, deformation of the cover 13 is further restricted.

(8) The cover 13 includes a plurality of second reinforcement ribs 47. The cover 13 further includes at least one joint rib 48 that joins the second reinforcement ribs 47 located adjacent to each other in the first direction X. With this structure, the rigidity of the second reinforcement ribs 47 is increased. Thus, the rigidity of the cover 13 is further increased. As a result, deformation of the cover 13 is further restricted.

(9) The cover 13 includes the two first reinforcement ribs 45. With this structure, the rigidity of the cover 13 is increased as compared to a structure in which the cover 13 includes only one first reinforcement rib 45. In addition, the shape of the cover 13 is simplified as compared to a structure in which the cover 13 includes three or more first reinforcement ribs 45. Furthermore, the material forming the cover 13 is reduced as compared to a structure in which the cover 13 includes three or more first reinforcement ribs 45. This reduces the manufacturing costs of the cover 13.

(10) In the cover 13 of the present embodiment, the exposed surface 43*a* does not include a reinforcement rib that extends in the first direction X. The exposed surface 43*a* includes the second reinforcement ribs 47, which are disposed between adjacent ones of the connection parts 21 in the first direction X as viewed in the third direction Z. Thus, even when the distance from the exposed surface 43*a* to the connection parts 21 is decreased in the third direction Z, the second reinforcement ribs 47 do not contact the connection parts 21 in a direction opposite to the third direction Z. As described above, in the cover 13, the second surface 43 does not include a reinforcement rib that has a possibility of contacting the connection parts 21 in a direction opposite to the third direction Z. This allows the second surface 43 to have a structure for increasing the rigidity of the cover 13 while limiting enlargement of the connector 10 in the third direction Z.

(11) In the present embodiment, the cover 13 is formed from a resin material. Even when the cover 13 is formed from a resin material, the rigidity of the cover 13 is increased by the first reinforcement ribs 45 and the second reinforcement ribs. This eliminates the need for adding a separate metal part to the cover 13 or forming the cover 13 from metal to restrict deformation of the cover 13. Thus, the manufacturing costs of the connector 10 are reduced.

(12) Each joint rib 48 joints the first ends, in the second direction Y, of the two second reinforcement ribs 47 located adjacent to each other in the first direction X. As viewed in the third direction Z, the first end of the second reinforcement rib 47 in the second direction Y refers to the end located closer to the distal end of the connection part 21 than to the basal end. When the cover 13 is properly positioned on the housing 12, the joint rib 48 is inserted between the inner circumferential surface of the housing 12 and the distal end of the connection part 21. When the cover 13 is reversely disposed in the first direction X and improperly positioned on the housing 12, the joint rib 48 contacts the terminal 14 in the vicinity of the basal end of the connection part 21 in a direction opposite to the third direction Z. The contact of the joint rib 48 with the terminal 14 hinders further movement of the cover 13 in a direction opposite to the third direction Z. Therefore, when the position of the cover 13 in the third direction Z differs from the proper position of the cover 13 with respect to the housing 12, further movement of the cover 13 in a direction opposite to the third direction Z is hindered. This allows one to recognize that the cover 13 is improperly positioned on the housing 12. As a result, erroneous coupling of the cover 13 to the housing 12 is avoided.

The present embodiment may be modified as follows. The present embodiment and the following modified examples can be combined within a range where the combined modified examples remain technically consistent with each other.

Figure 8:
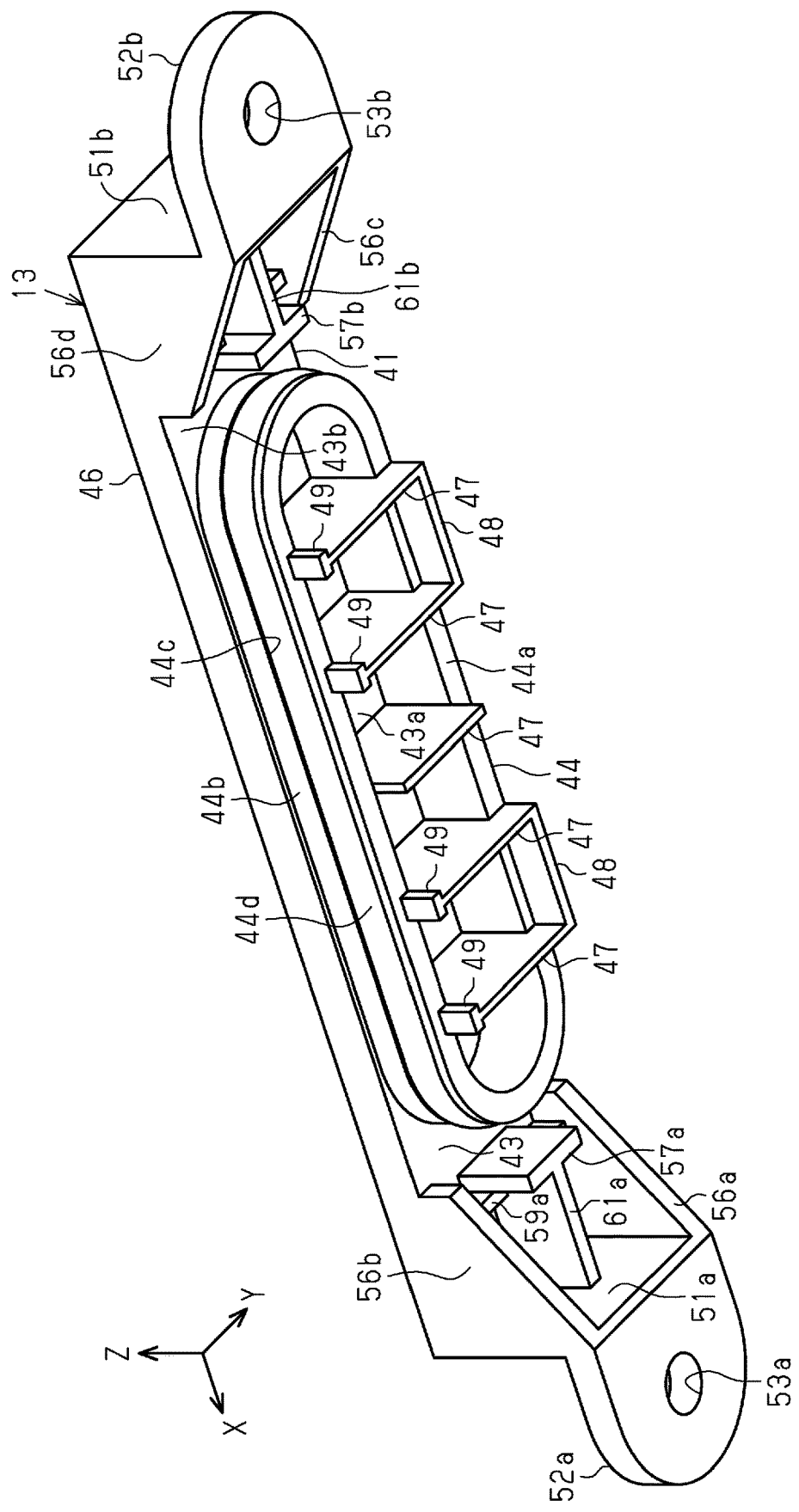
FIG. 8 is a perspective view of a cover in a first modified example.

The number of joint ribs 48 is not limited to one. The cover 13 may include a plurality of joint ribs 48. FIG. 8 shows a first modified example in which the cover 13 includes five second reinforcement ribs 47 arranged next to each other in the first direction X. In this case, the cover 13 may include two joint ribs 48, each of which joins two of the second reinforcement ribs 47 located at one of the opposite sides of the center second reinforcement rib 47. In FIG. 8, the same reference characters are given to those components that are the same as the corresponding components in the above embodiment.

The joint ribs 48 may project from the distal surface of the side wall 44b. When the cover 13 does not include the sealing portion 44, the joint ribs 48 may project from the second surface 43 and join the second reinforcement ribs 47 located adjacent to each other in the first direction X. The joint rib 48 may be omitted from the cover 13.

The auxiliary rib 49 may be integrated with at least one second reinforcement rib 47. In an example, of a plurality of second reinforcement ribs 47, at least one second reinforcement rib 47 does not have to be integrated with the auxiliary rib 49. The auxiliary rib 49 may be integrated with the first end of the second reinforcement rib 47 in the second direction Y and may be integrated with the second end of the second reinforcement rib 47 in the second direction Y. The auxiliary rib 49 may be omitted from the cover 13.

The peripheral wall 46 does not have to be annular. More specifically, the peripheral wall 46 may project from the first surface 42 and extend along a portion of the peripheral edge of the first surface 42.

The shape of the peripheral wall 46 is not limited to that in the embodiment. Since the peripheral wall 46 extends along the peripheral edge of the first surface 42, the shape of the peripheral wall 46 may be changed in conformance with the shape of the first surface 42 as viewed in the third direction Z. The peripheral wall 46 may be omitted from the cover 13.

The cover 13 may include only one of the first reinforcement parts 58a and 58b. Alternatively, the first reinforcement parts 58a and 58b may be omitted from the cover 13. The cover 13 may include only one of the second reinforcement parts 59a and 59b. Alternatively, the second reinforcement parts 59a and 59b may be omitted from the cover 13.

In the present embodiment, the first guides 34a and 34b include the guide recesses 35a and 35b, respectively. The second guides 57a and 57b are fitted into the guide recesses 35a and 35b, respectively. Instead, the second guides 57a and 57b may include a guide recess into which the corresponding one of the first guides 34a and 34b is fitted.

Of the first guides 34a and 34b and the second guides 57a and 57b, the cover 13 may include only the first guide 34a and the second guide 57a. Of the first guides 34a and 34b and the second guides 57a and 57b, the cover 13 may include only the first guide 34b and the second guide 57b. The first guides 34a and 34b and the second guides 57a and 57b may be omitted from the cover 13.

The length of the second reinforcement rib 47 projected from the second surface 43 may be shorter than the distance from the second surface 43 to the connection surface 23.

The cover 13 does not necessarily have to include the sealant 44d. The sealing portion 44 may be omitted from the cover 13.

The shape of the cover 13 is not limited to that in the embodiment. The cover 13 may have any shape that includes at least one first reinforcement rib 45 and at least one second reinforcement rib 47. In an example, the shape of each of the projection walls 51a and 51b, the fixing portions 52a and 52b, and the rib walls 56a to 56d may be changed. The cover 13 may further include a reinforcement rib that projects from the exposed surface 43a and extends in the first direction X. In this case, the dimension of the reinforcement rib in the third direction Z is set so that the reinforcement rib does not contact the connection parts 21.

Figure 9:
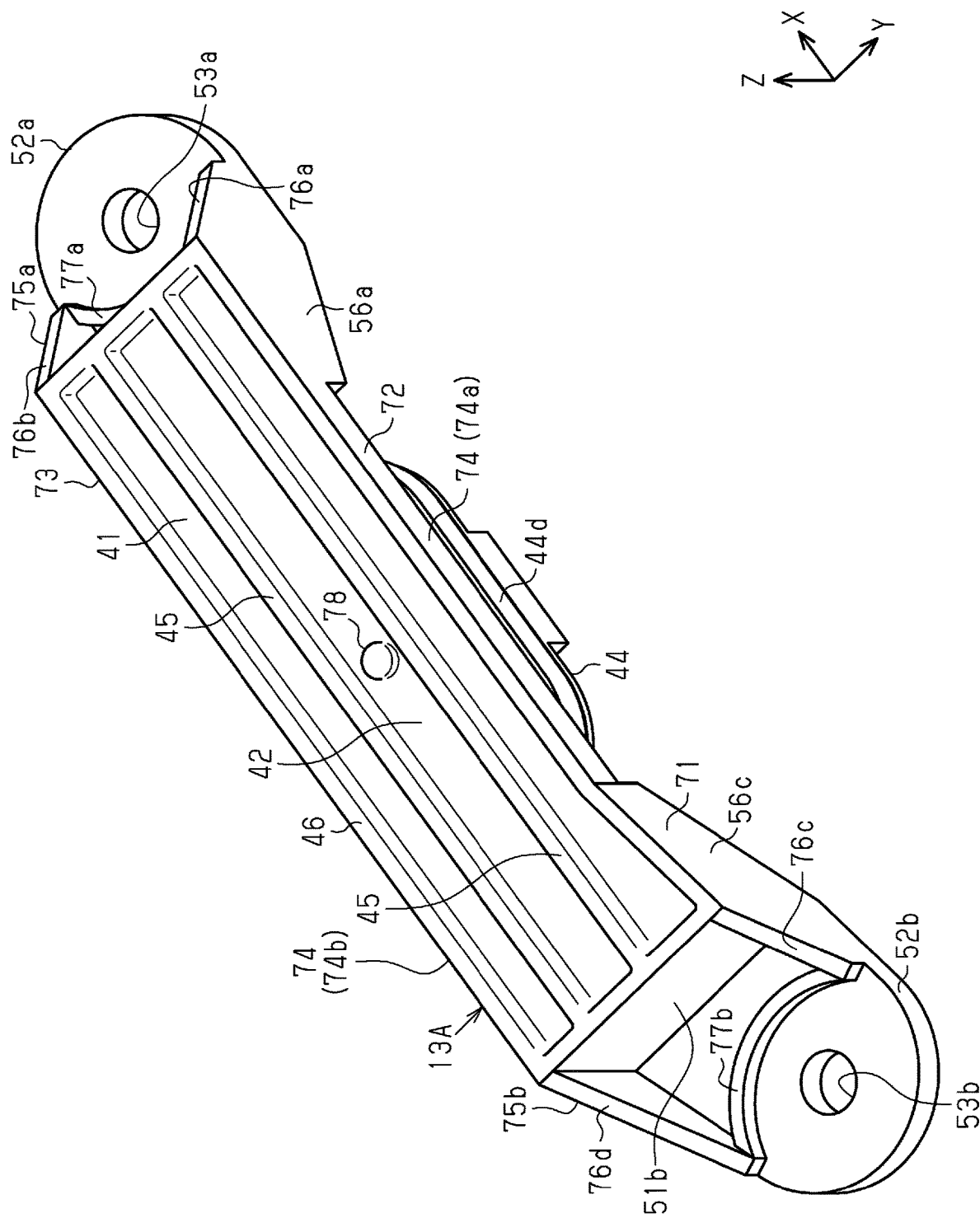
FIG. 9 is a perspective view of a cover in a second modified example.
Figure 10:
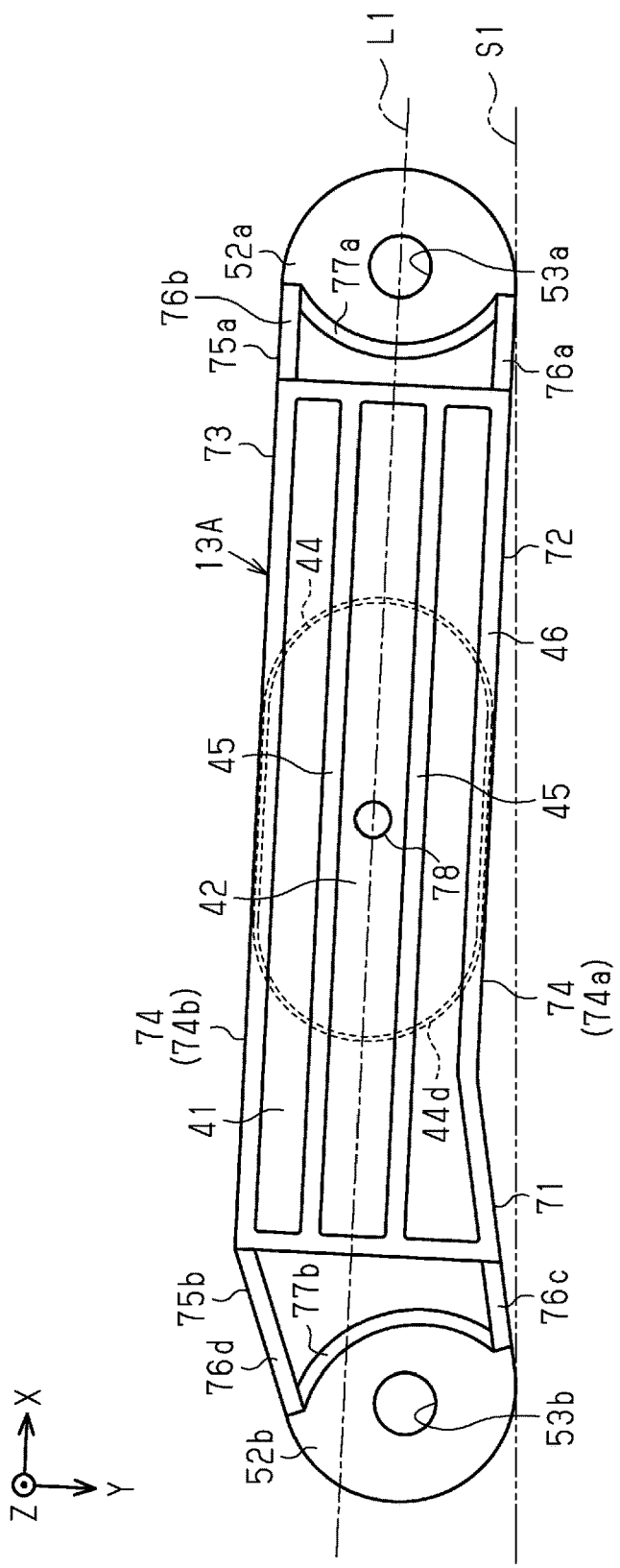
FIG. 10 is a plan view of the cover shown in FIG. 9.

FIGS. 9 and 10 show a second modified example of a cover 13A that includes a protrusion 71. In FIGS. 9 and 10, the same reference characters are given to those components that are the same as the corresponding components of the embodiment.

As shown in FIGS. 9 and 10, the cover 13A includes a first end surface 72 and a second end surface 73 in the second direction Y One of the first end surface 72 and the second end surface 73 includes an outward surface 74 extending in the first direction X. In an example, each of the end surface 72 and the end surface 73 includes the outward surface 74. The outward surface 74 of the end surface 72 is referred to as an outward surface 74a. The outward surface 74 of the end surface 73 is referred to as an outward surface 74b. In an example, the outward surfaces 74a and 74b are planar and orthogonal to the second direction Y. In an example, the outward surface 74a is parallel to the outward surface 74b.

The cover 13A includes a protrusion 71 protruding from the outward surface 74a in the second direction Y. In an example, the protrusion 71 is located in a second end region of the cover 13A in the first direction X. The protrusion 71 includes a distal end in the protrusion direction, that is, the protrusion 71 includes a distal end in the second direction Y. The distal end is located at an outer side of the cover 13A from the sealant 44d as viewed in the third direction Z.

With this structure, when the cover 13A is not coupled to the housing 12 and is placed on a surface S1 of a ground, a floor, or the like, the cover 13A may be located so that the outward surface 74a, from which the protrusion 71 protrudes, faces the surface S1. FIG. 10 shows the cover 13A that is located so that the outward surface 74a faces the surface S1 of a ground, a floor, or the like. In this case, the cover 13A is located on the surface S1 so that the outward surface 74a is spaced apart from the surface S1 by the protrusion 71. That is, the cover 13A is partially lifted by the protrusion 71 and is located on the surface S1. Thus, the sealing portion 44 is likely to be disposed at a position separated upward from the surface S1. This limits contact of the surface S1 with the sealant 44d, which is disposed on the outer surface of the sealing portion 44. Accordingly, objects such as sand or dust on the surface S1 are less likely to collect on the sealant 44d. When the cover 13A is coupled to the housing 12, objects are less likely to be caught between the sealant 44d and the housing 12. Thus, the sealant 44d is in satisfactory tight contact with the housing 12. The sealant 44d demonstrates a sufficient sealing property.

The protrusion 71 is disposed on the outward surface 74a but is not disposed on the outward surface 74b. When a person couples the cover 13A to the housing 12, the protrusion 71 is used as a mark for determining the orientation of the cover 13A with respect to the housing 12. Thus, coupling of the cover 13A to the housing 12 at an improper position is avoided. In addition, the task efficiency of coupling the cover 13A to the housing 12 is improved.

The cover 13A may include at least one protrusion 71 protruding from the outward surface 74b in a direction opposite to the second direction Y. In this case, in the cover 13A, the outward surface 74a may include at least one protrusion 71. Alternatively, the protrusion 71 may be omitted from the outward surface 74a.

In the cover 13A shown in FIGS. 9 and 10, the fixing portion 52a projects from the distal end of the projection wall 51a in the first direction X. As viewed in the third direction Z, the fixing portion 52b projects from the distal end of the projection wall 51b in a direction intersecting the first direction X. In an example, as viewed in the third direction Z, the distal end of the fixing portion 52b is located at a position separated from the distal end of the fixing portion 52a in the second direction Y.

As shown in FIG. 10, as viewed in the third direction, the fixing hole 53a in the fixing portion 52a and the fixing hole 53b in the fixing portion 52b may be located at different positions in the second direction Y. In FIG. 10, the single-dashed line refers to a center line L1 that extends parallel to the first direction X through the center between the outward surface 74a and the outward surface 74b in the second direction Y as viewed in the third direction Z. In an example, as viewed in the third direction Z, the center of the fixing hole 53a is located on the center line L1. In an example, as viewed in the third direction Z, the center of the fixing hole 53b is located at a position separated from the center line L1 in the second direction Y.

As shown in FIGS. 9 and 10, the cover 13A may include fixing portion ribs 75a and 75b projecting from the fixing portions 52a and 52b, respectively.

The fixing portion rib 75a projects from the fixing portion 52a in the third direction Z. In an example, the fixing portion rib 75a includes edge ribs 76a and 76b and a joint portion 77a. The edge rib 76a extends along a first end of the fixing portion 52a in the second direction Y. The edge rib 76b extends along a second end of the fixing portion 52a in the second direction Y. Each of the edge ribs 76a and 76b includes a second end in the first direction X joined to the projection wall 51a. Each of the edge ribs 76a and 76b projects from the fixing portion 52a by a length that decreases as the projection wall 51a becomes farther in the first direction X.

The joint portion 77a projects from the fixing portion 52a in the third direction Z. The joint portion 77a joins the edge rib 76a and the edge rib 76b on a first end surface of the fixing portion 52a in the third direction Z. As viewed in the third direction Z, the joint portion 77a is disposed between the projection wall 51a and the fixing hole 53a. In an example, as viewed in the third direction Z, the joint portion 77a is arc-shaped. The shape of the joint portion 77a as viewed in the third direction Z is not limited to the shape of an arc and may be any shape that joins the edge rib 76a and the edge rib 76b. In an example, as viewed in the third direction Z, the shape of the joint portion 77a may be linear, bent, or any type of curve.

The fixing portion rib 75b projects from the fixing portion 52b in the third direction Z. In an example, the fixing portion rib 75b includes edge ribs 76c and 76d and a joint portion 77b. The edge rib 76c extends along a first end of the fixing portion 52b in the second direction Y. The edge rib 76d extends along a second end of the fixing portion 52b in the second direction Y. Each of the edge ribs 76c and 76d includes a first end in the first direction X joined to the projection wall 51b. Each of the edge ribs 76c and 76d projects from the fixing portion 52b by a length that decreases as the projection wall 51b becomes farther in a direction opposite to the first direction X.

The joint portion 77b projects from the fixing portion 52b in the third direction Z. The joint portion 77b joins the edge rib 76c and the edge rib 76d on a first end surface of the fixing portion 52b in the third direction Z. As viewed in the third direction Z, the joint portion 77b is disposed between the projection wall 51b and the fixing hole 53b. In an example, as viewed in the third direction Z, the joint portion 77b is arc-shaped. The shape of the joint portion 77b as viewed in the third direction Z is not limited to the shape of an arc and may be any shape that joins the edge rib 76c and the edge rib 76d. In an example, as viewed in the third direction Z, the shape of the joint portion 77b may be linear, bent, or any type of curve.

With this structure, the rigidity of the cover 13A near the fixing portions 52a and 52b is increased by the fixing portion ribs 75a and 75b. Thus, when the cover 13A receives an external force, deformation of the cover 13A is further restricted.

As described above, in the cover 13A shown in FIGS. 9 and 10, the fixing holes 53a and 53b are located at different positions in the second direction Y as viewed in the third direction Z. Thus, when the cover 13A receives an external force that pushes the exposed surface 43a toward the outside of the housing 12, stress concentration is more likely to occur than in the cover 13A in which the fixing holes 53a and 53b are aligned with each other in the second direction Y as viewed in the third direction Z. For example, in the cover 13A, stress may concentrate on one of the fixing portion 52a having the fixing hole 53a and the fixing portion 52b having the fixing hole 53b. In this regard, the fixing portion ribs 75a and increase the rigidity of the fixing portions 52a and 52b and part of the cover 13A located near the fixing portions 52a and 52b. Thus, although the fixing holes 53a and 53b are located at different positions in the second direction Y as viewed in the third direction Z, when an external force is applied to the cover 13A, the cover 13A is less likely to deform.

The cover 13A may include only the fixing portion rib 75a or may include only the fixing portion rib 75b.

The cover 13A shown in FIGS. 9 and 10 is formed by injection molding. The cover 13A includes a gate mark 78 on the first surface 42. The gate mark 78 is formed because the gate is set to be located on the first surface 42 when the cover 13A is formed by injection molding. As viewed in the third direction Z, the gate mark 78 is located at a position separated from the first reinforcement ribs 45 in the second direction Y. As viewed in the third direction Z, the gate mark 78 is not lined with the first reinforcement ribs 45 in the first direction X. In an example, as viewed in the third direction Z, the gate mark 78 is located between two first reinforcement ribs 45. Alternatively, as viewed in the third direction Z, the gate mark 78 may be located between one of the two first reinforcement ribs 45 and part of the peripheral wall 46 that is located adjacent to the first reinforcement rib 45 in the second direction Y.

Thus, the gate mark 78 is located avoiding the first reinforcement ribs 45. This allows the first reinforcement ribs 45 to continuously extend in the first direction X from the first end of the first surface 42 in the first direction X to the second end of the first surface 42 in the first direction X. Thus, the rigidity of the cover 13A is increased as compared to a structure in which each first reinforcement rib is separated into pieces in the first direction X.

The housing 12 is not limited to the shape of the embodiment and may have any shape that includes the opening 11 and is configured to hold the terminals 14.

In the embodiment described above, the first direction X refers to the direction extending from the connection part 21a toward the connection part 21c. Alternatively, the first direction X may refer to a direction extending from the connection part 21c toward the connection part 21a. In the embodiment described above, the second direction Y orthogonally intersects the first direction X. Alternatively, the angle at which the second direction Y intersects the first direction X may be changed in accordance with the shape of the connection part 21. The third direction Z may differ from that of the embodiment and may be any direction that orthogonally intersects the first direction X and the second direction Y.

The present disclosure includes the following modes. To facilitate understanding, the reference signs of some of the components of the exemplary embodiment are provided with no intention to limit. In the following modes, some of the elements may be omitted or may be selected or extracted to be combined with each other.

[Clause 1] A connector (10) according to a mode of the present disclosure, including:
terminals (14) arranged next to each other, each of the terminals (14) including a connection part (21) configured to be electrically connected to a mate terminal (9);
a connector housing (12) that holds the terminals (14), the connector housing (12) defining an accommodation cavity that accommodates the connection parts (21) arranged next to each other and an opening (11) connected to the accommodation cavity; and
a cover (13) that closes the opening (11), in which the cover (13) may include
a first surface (42) located at a side opposite to the connector housing (12),
at least one first reinforcement rib (45) extending on the first surface (42) in a longitudinal direction of the cover (13),
a second surface (43) covering the accommodation cavity, and
at least one second reinforcement rib (47) extending on the second surface (43) along the connection parts (21).

[Clause 2] In an embodiment, the second reinforcement rib (47) and the first reinforcement rib (45) may project in opposite directions.

[Clause 3] In an embodiment, the second reinforcement rib (47) and the first reinforcement rib (45) may extend in different directions.

[Clause 4] In an embodiment, the cover (13) may include a sealing portion (44) projecting from the second surface (43) and extending along the opening (11).

[Clause 5] In an embodiment, the first surface (42) may be located at a side opposite to the second surface (43).

[Clause 6] In an embodiment, the second reinforcement rib (47) may intersect the sealing portion (44).

[Clause 7] In an embodiment, the cover (13) may include first reinforcement ribs (45) arranged parallel to each other.

[Clause 8] In an embodiment, the cover (13) may include second reinforcement ribs (47) arranged parallel to each other.

[Clause 9] In an embodiment, the second reinforcement ribs (47) may partition the accommodation cavity.

REFERENCE SIGNS LIST 9) mate terminal
10) connector
11) opening
12) connector housing (housing)
13, 13A) cover
14) terminal
21, 21a to 21c) connection part
22) terminal main body
23) connection surface
25) electric wire
31) housing main body
32) insertion opening
33) electric wire holder
34a, 34b) first guide
35b) guide recess
41) closing portion
42) first surface
43) second surface
43a) exposed surface
43b) non-facing surface
44) sealing portion
44a, 44b) side wall
44c) sealing groove
44d) sealant
45) first reinforcement rib
46) peripheral wall
47) second reinforcement rib
48) joint rib
49) auxiliary rib
51a, 51b) projection wall
52a, 52b) fixing portion
53a, 53b) fixing hole
56a to 56d) rib wall 57a, 57b) second guide
58a, 58b) first reinforcement part
59a, 59b) second reinforcement part
61a, 61b) third reinforcement rib
71) protrusion
72, 73) end surface
74, 74a, 74b) outward surface
75a, 75b) fixing portion rib
76a to 76d) edge rib
77a, 77b) joint portion
78) gate mark
D1, D2, D3) distance
L1) center line
S1) surface
X) first direction
Y) second direction
Z) third direction

The invention claimed is:

1. A connector comprising:
a connector housing including an opening;
a cover closing the opening; and
terminals held by the connector housing, wherein
each of the terminals includes a connection part configured to be electrically connected to one of a plurality of mate terminals, the mate terminals differing from one another,
the connection parts are arranged in a line in the connector housing,
the cover includes a first surface exposed outside the connector housing and a second surface located at a rear side of the first surface,
the second surface includes an exposed surface exposed through the opening to an inner side of the connector housing,
the cover further includes at least one first reinforcement rib projecting from the first surface and at least one second reinforcement rib projecting from the second surface,
when a first direction refers to a direction in which the connection parts are arranged, a second direction refers to a direction intersecting the first direction and extending from a basal end to a distal end of the connection parts, and a third direction refers to a direction orthogonal to the first direction and the second direction, the first reinforcement rib extends in the first direction, and the second reinforcement rib extends in the second direction between adjacent ones of the connection parts as viewed in the third direction.

2. The connector according to claim 1, wherein
the cover includes a sealing portion projecting from the second surface to surround the exposed surface as viewed in the third direction, the sealing portion is fitted into the opening, and
at least one of the second reinforcement rib is greater than the sealing portion in a length of projection from the second surface.

3. The connector according to claim 1, wherein
the cover includes a resin molding component, and as viewed in any of the second direction and the third direction, the second reinforcement rib is disposed between each two of the connection parts located adjacent to each other in the first direction.

4. The connector according to claim 1, wherein
the second surface extends wider than the exposed surface in opposite directions along the first direction,
the connector housing includes two first guides extending in the third direction from two ends of the connector housing located at opposite sides in the first direction,
the cover includes two second guides projecting from two parts of the second surface located outward from the exposed surface in the first direction, and
the two second guides are fitted to the two first guides using a recess and a projection to restrict misalignment of the connector housing with the cover in the first direction and the second direction.

5. The connector according to claim 4, wherein
the cover includes two first reinforcement parts and/or two second reinforcement parts,
the two first reinforcement parts extend on the second surface from the two second guides to a first end of the cover in the second direction, and
the two second reinforcement parts extend on the second surface from the two second guides to a second end of the cover in the second direction.

6. The connector according to claim 1, wherein the cover includes a peripheral wall projecting from the first surface and extending along a peripheral edge of the first surface.

7. The connector according to claim 6, wherein the peripheral wall annularly extends along the peripheral edge of the first surface.

8. The connector according to claim 1, wherein
the at least one second reinforcement rib includes second reinforcement ribs, and
the cover includes at least one joint rib that joins ones of the second reinforcement ribs that are located adjacent to each other in the first direction.

9. The connector according to claim 1, wherein the cover includes two of the first reinforcement rib.

10. The connector according to claim 1, wherein
the cover includes two end surfaces located in the second direction,
at least one of the two end surfaces includes an outward surface extending in the first direction, and
the cover includes
a sealing portion projecting from the second surface to surround the exposed surface as viewed in the third direction, the sealing portion is fitted into the opening,
an annular sealant sealing a gap between the connector housing and an outer surface of the sealing portion that faces the connector housing, and
a protrusion protruding from at least one of the outward surface in the second direction or a direction opposite to the second direction.

\* \* \* \* \*